United States Patent
Wada et al.

(10) Patent No.: US 8,203,793 B2
(45) Date of Patent: Jun. 19, 2012

(54) OPTICAL SYSTEM AND OPTICAL APPARATUS INCLUDING THE SAME

(75) Inventors: Ken Wada, Sakura (JP); Arata Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 12/827,749

(22) Filed: Jun. 30, 2010

(65) Prior Publication Data

US 2011/0002046 A1 Jan. 6, 2011

(30) Foreign Application Priority Data

Jul. 2, 2009 (JP) ................................ 2009-157739

(51) Int. Cl.
*G02B 15/14* (2006.01)
(52) U.S. Cl. ........................ 359/680; 359/683
(58) Field of Classification Search ............... 348/240.3; 359/676, 680, 681, 682, 683
See application file for complete search history.

(56) References Cited

U.S. PATENT DOCUMENTS

| | | | |
|---|---|---|---|
| 7,016,118 B2 * | 3/2006 | Wada | 359/676 |
| 7,151,636 B2 * | 12/2006 | Yasui | 359/680 |
| 7,292,398 B1 | 11/2007 | Misaka | |
| 7,480,102 B2 | 1/2009 | Yokoyama | |
| 7,995,283 B2 * | 8/2011 | Wada | 359/682 |

FOREIGN PATENT DOCUMENTS

| JP | 2001-188172 A | 7/2001 |
|---|---|---|
| JP | 2007-178894 A | 7/2007 |

* cited by examiner

*Primary Examiner* — David N Spector
(74) *Attorney, Agent, or Firm* — Canon U.S.A., Inc. IP Division

(57) ABSTRACT

An optical system having a larger total lens length than a focal length includes lenses L and NL on at least one of a magnification conjugate side and a reduction conjugate side with respect to an aperture stop. The lens L satisfies conditional expressions as follows, $$-1.68 \times 10^{-3} \cdot v_L + 0.590 < \theta_L < 3.15 \times 10^{-4} \cdot v_L^2 - 1.86 \times 10^{-2} \cdot v_L + 0.878, \text{ and}$$

$$5 < v_L < 27,$$

where $v_L$ and $\theta_L$ are an Abbe number and a gF-line partial dispersion ratio of the lens L. The refractive power of the lens L is positive when located at the magnification conjugate side, or negative when located at the reduction conjugate side.

11 Claims, 20 Drawing Sheets

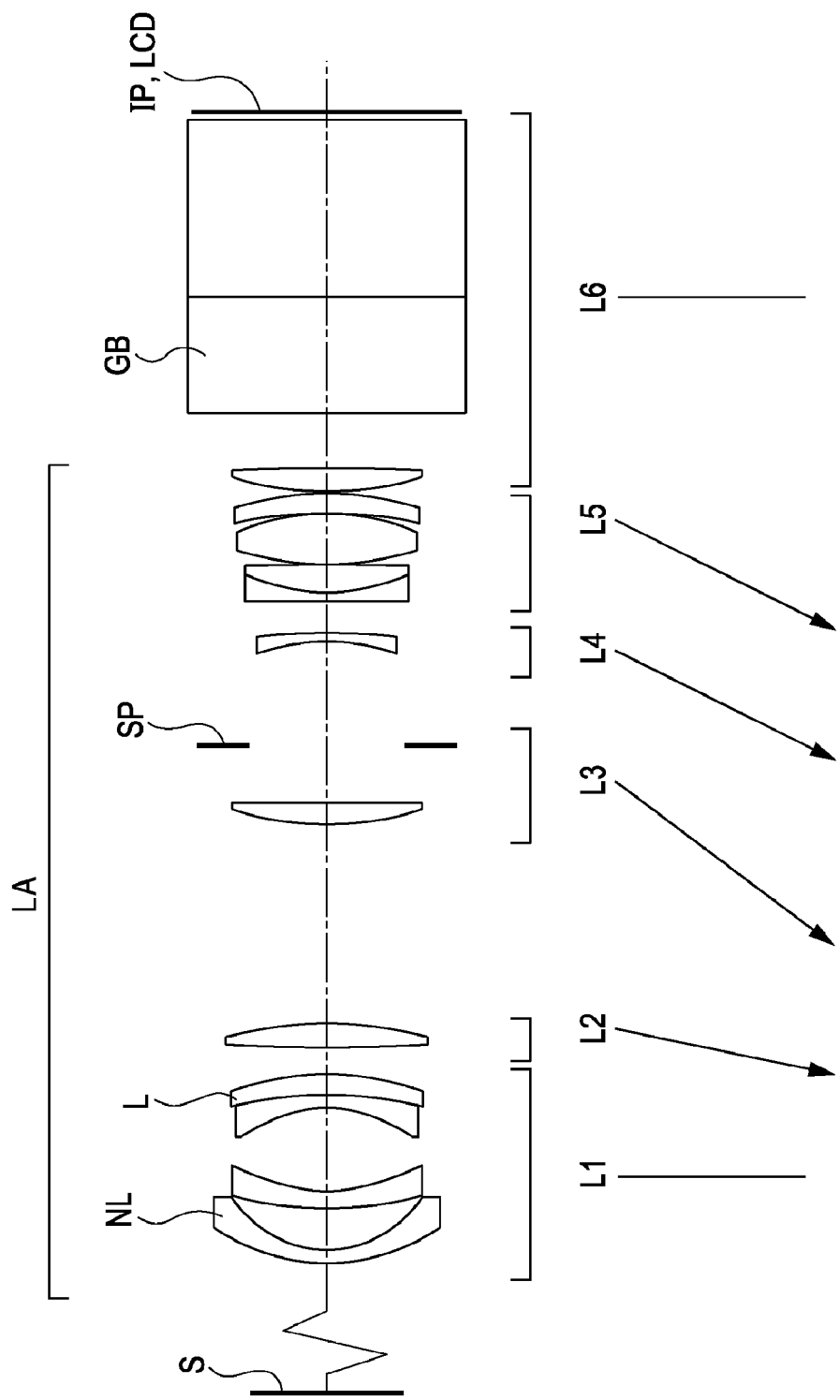

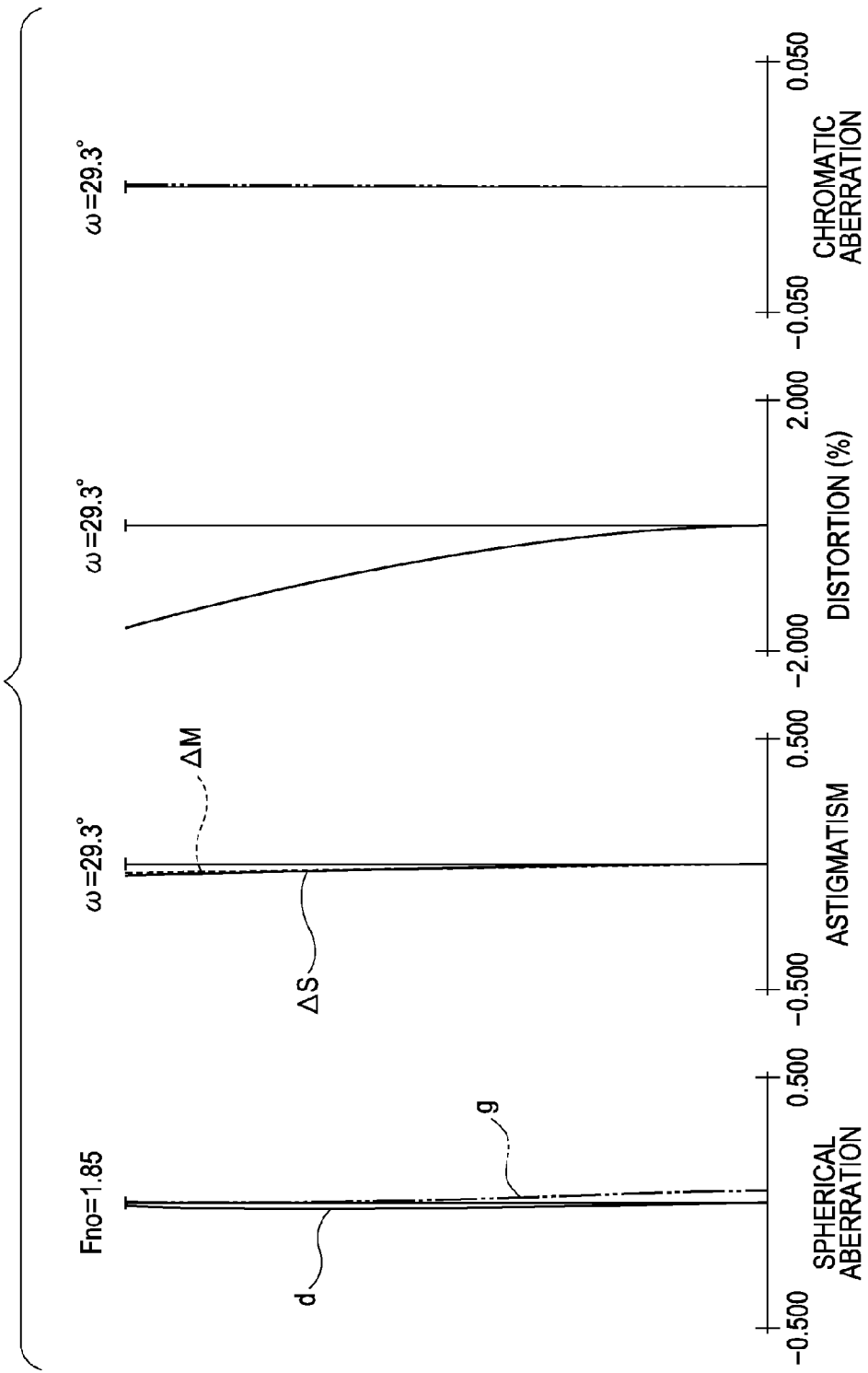

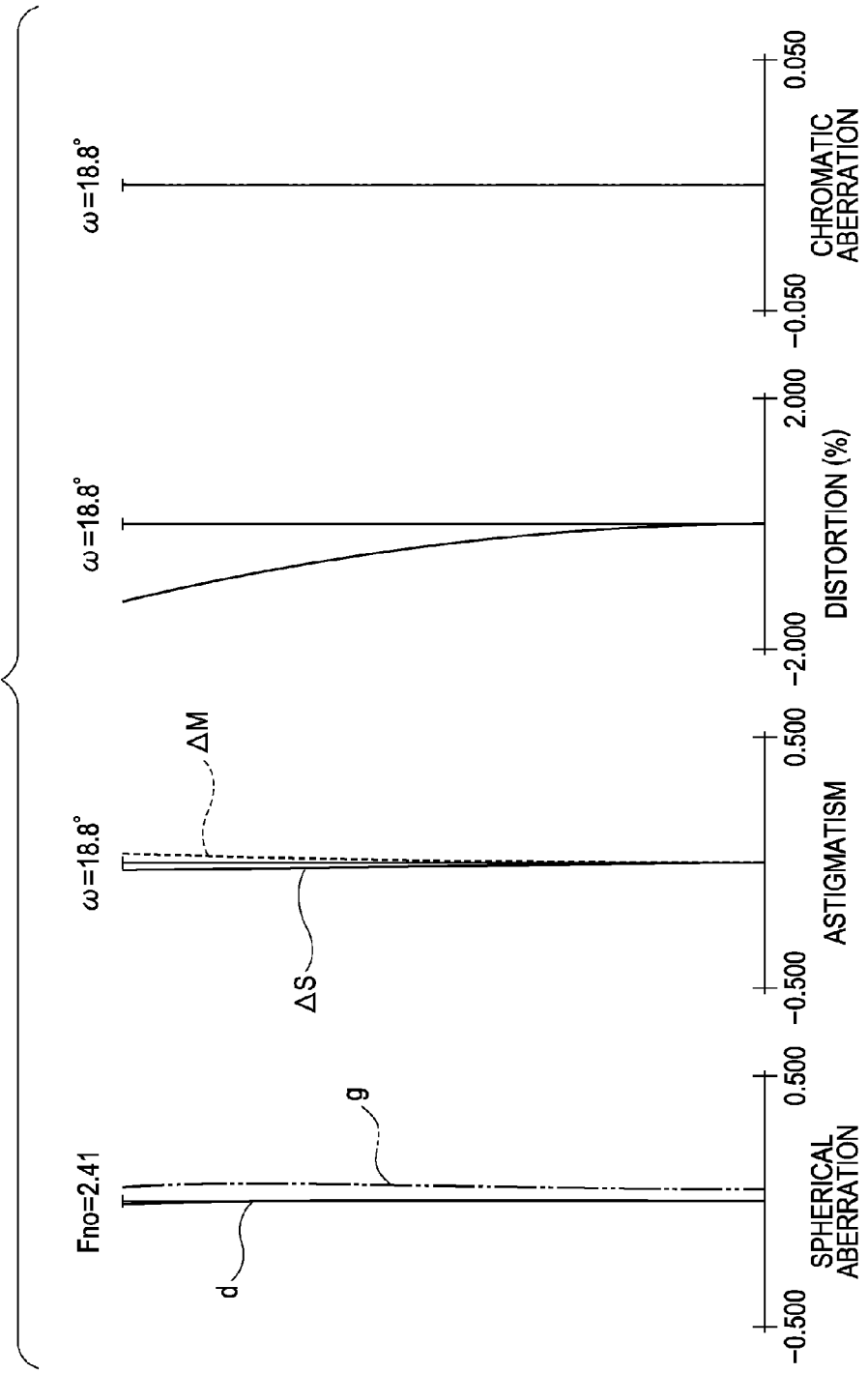

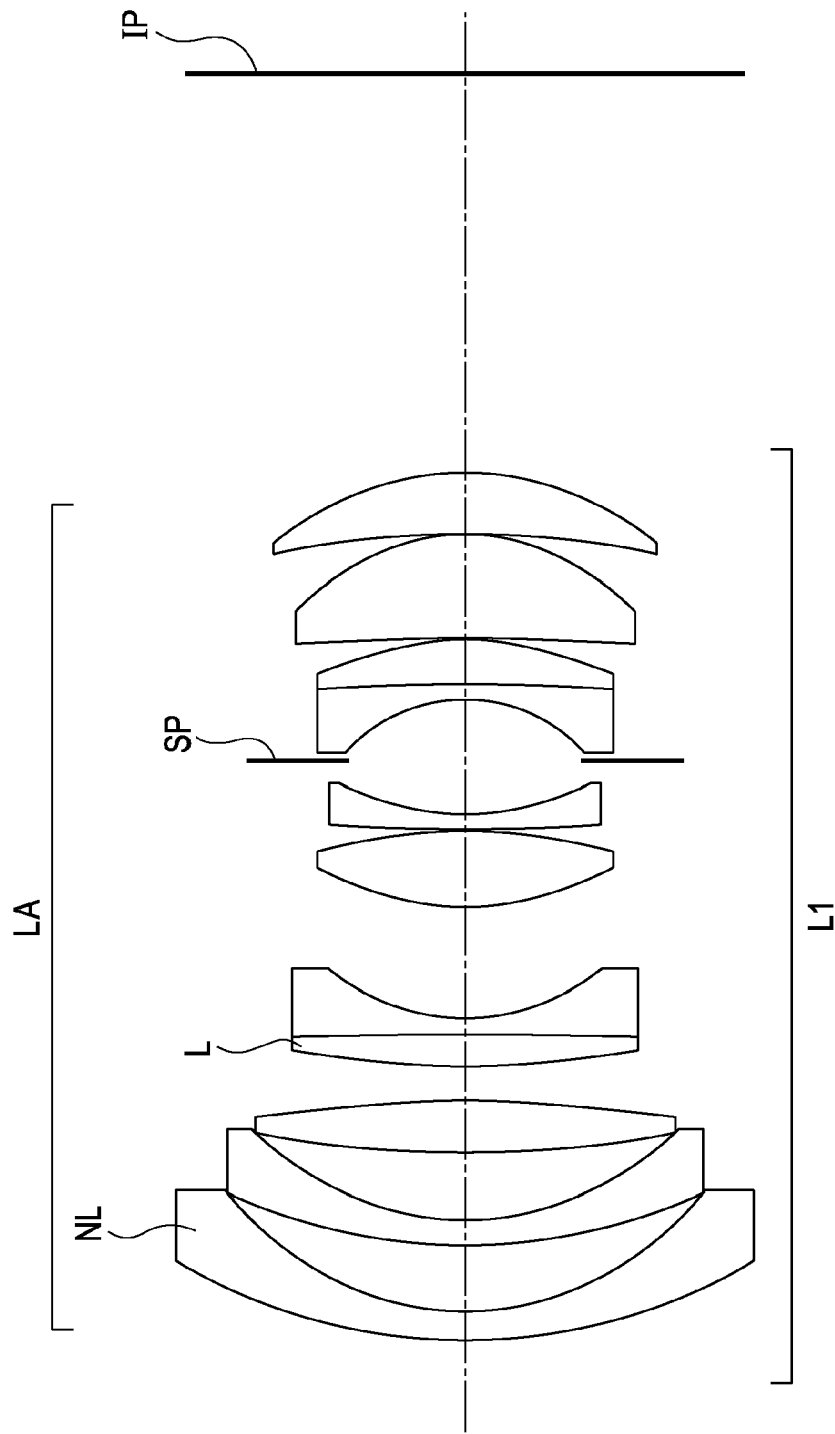

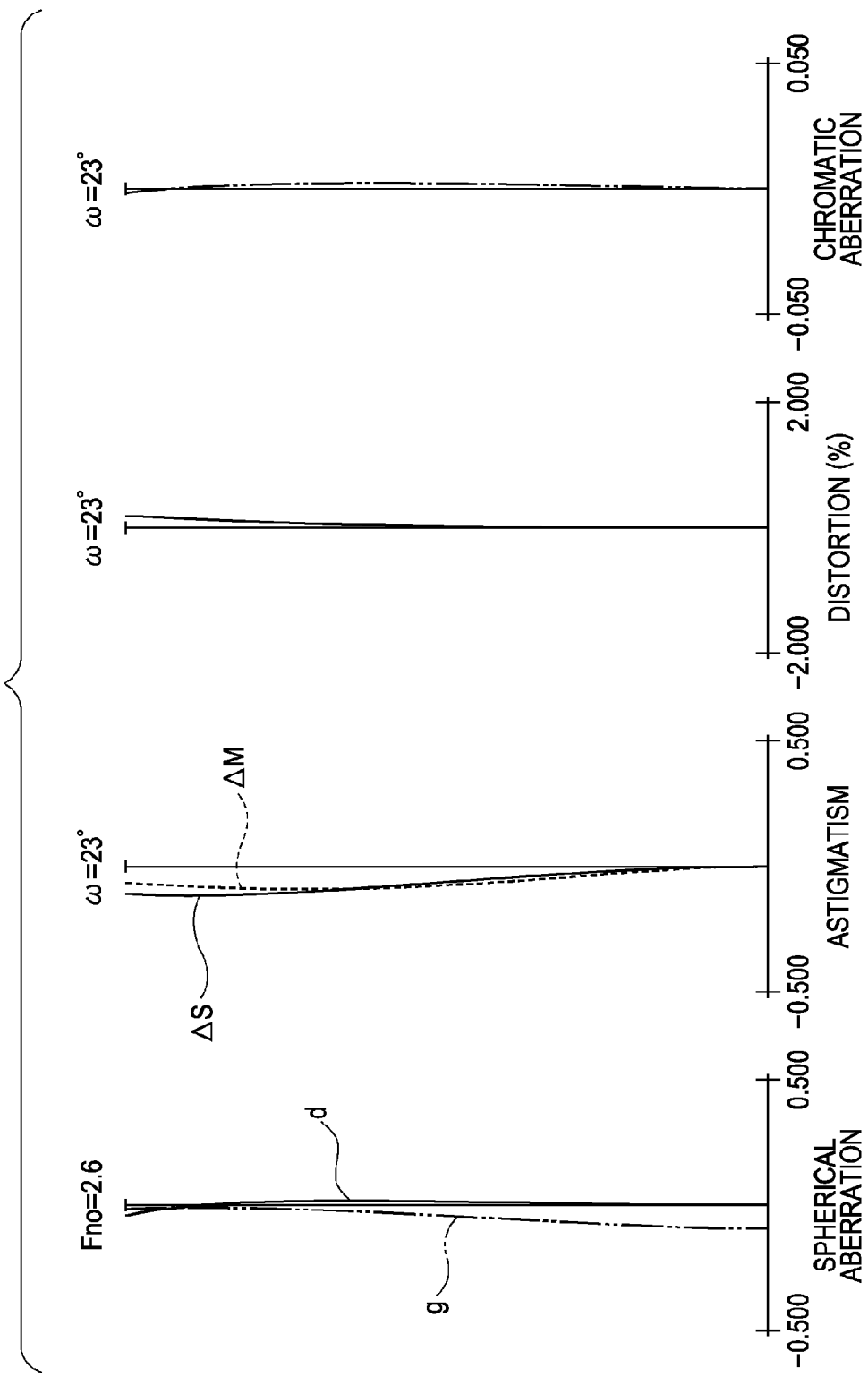

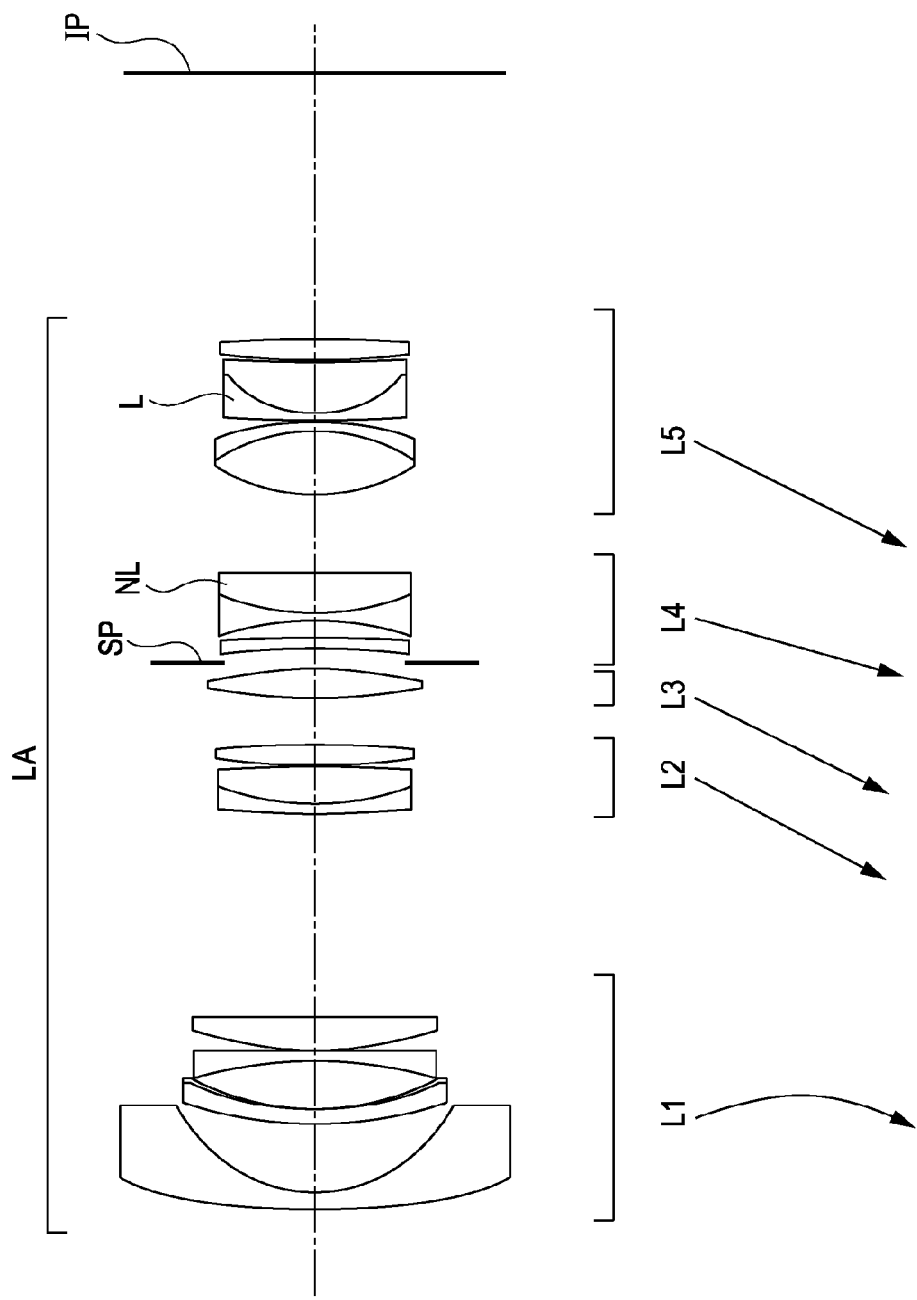

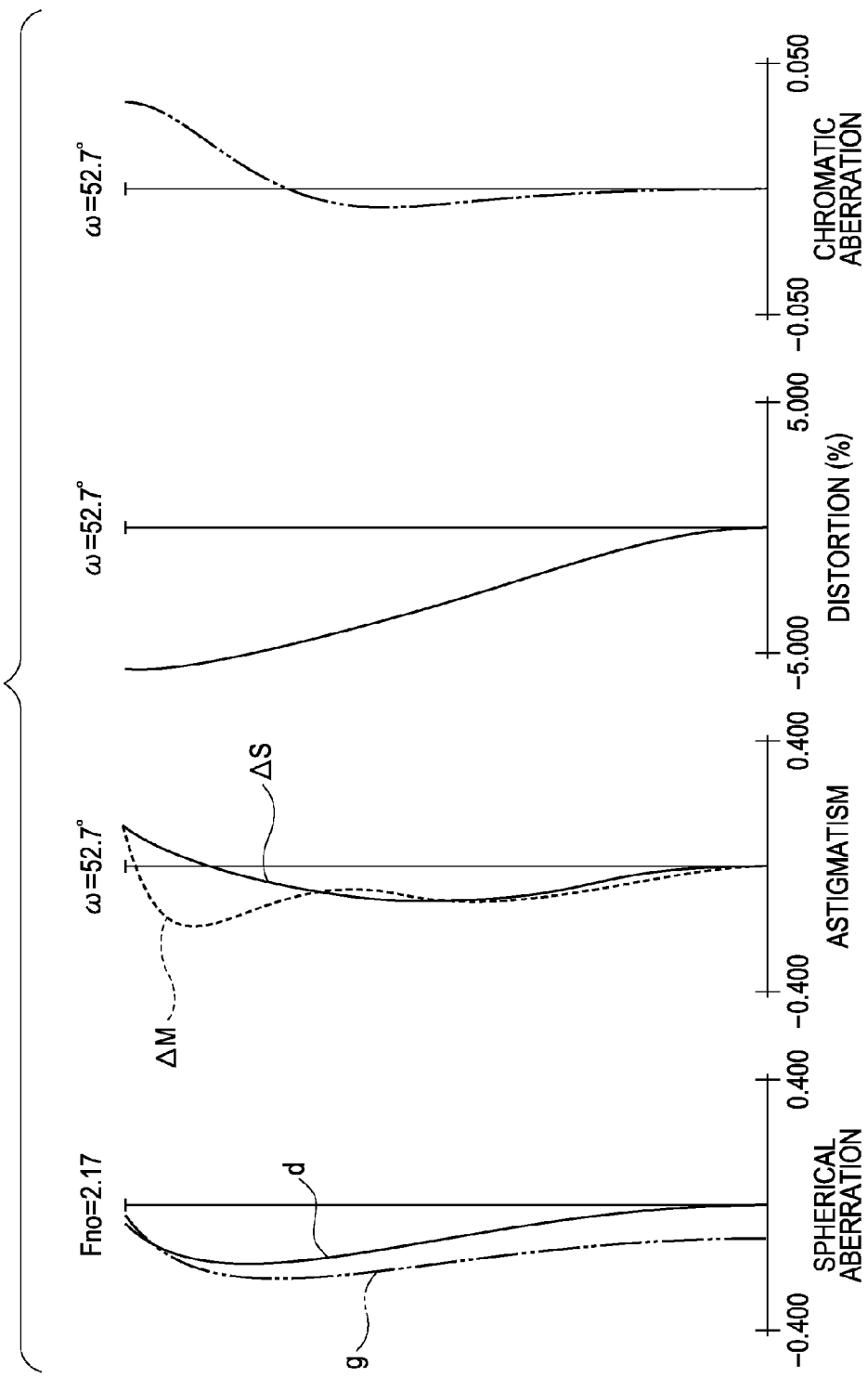

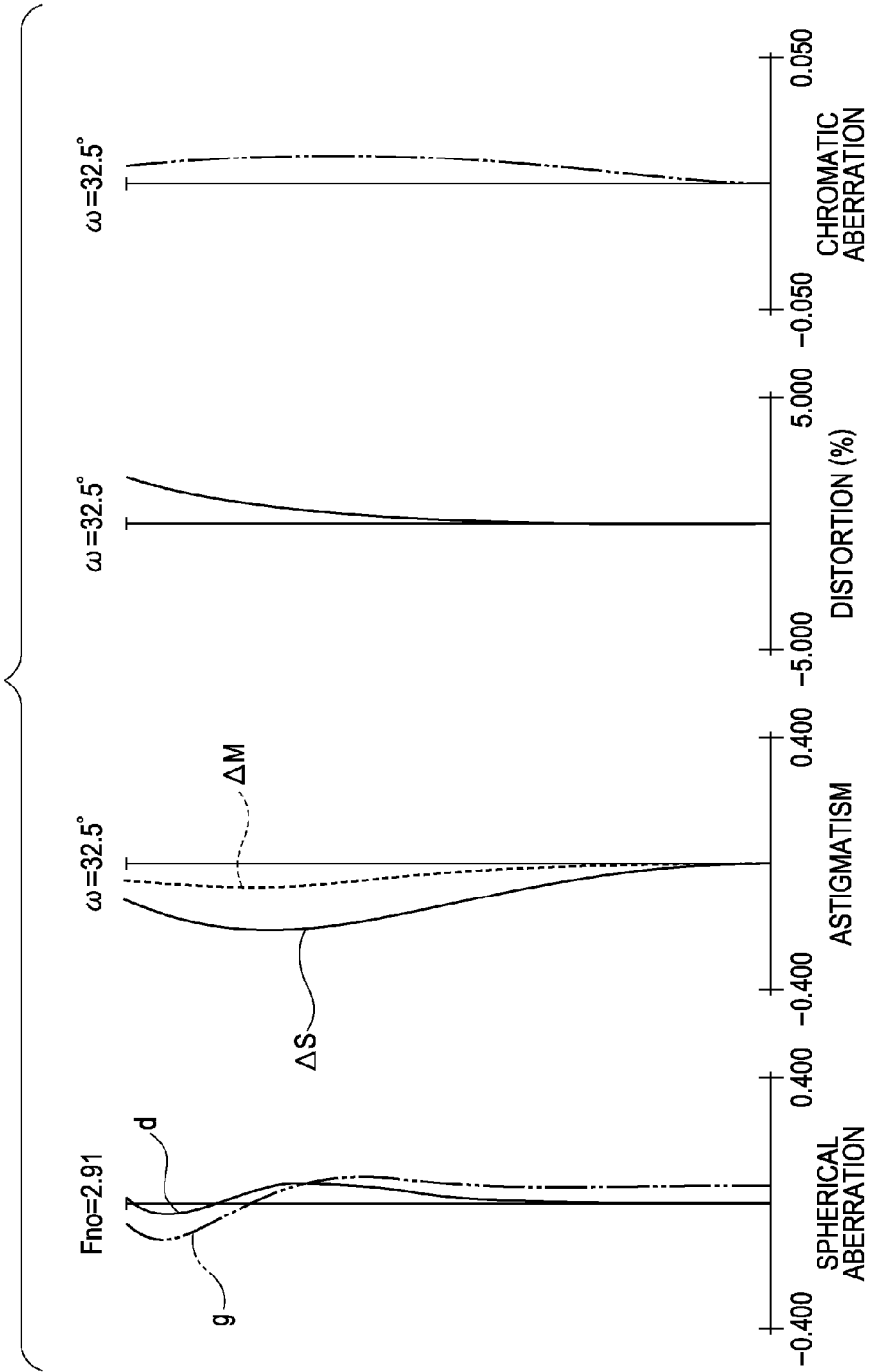

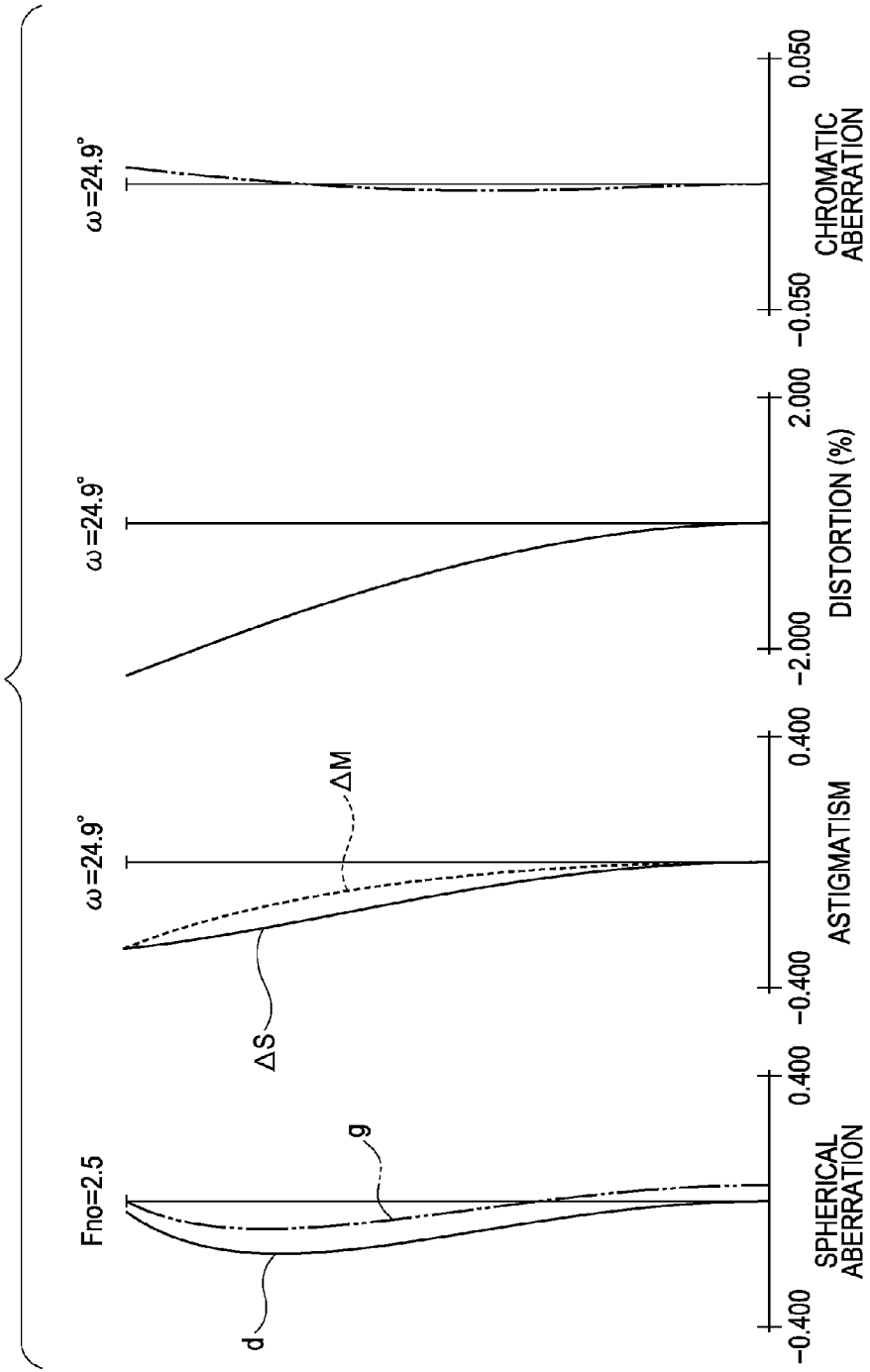

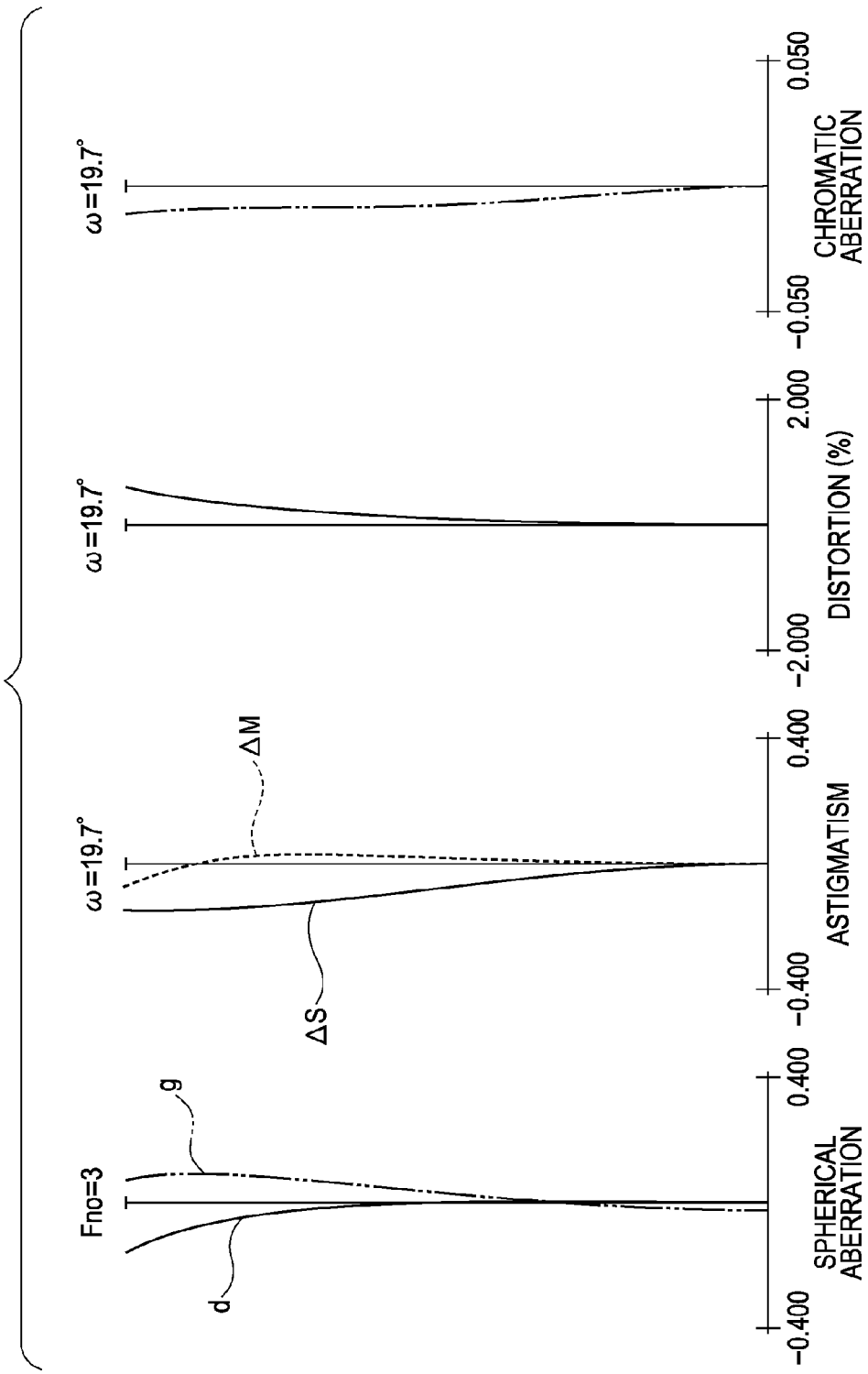

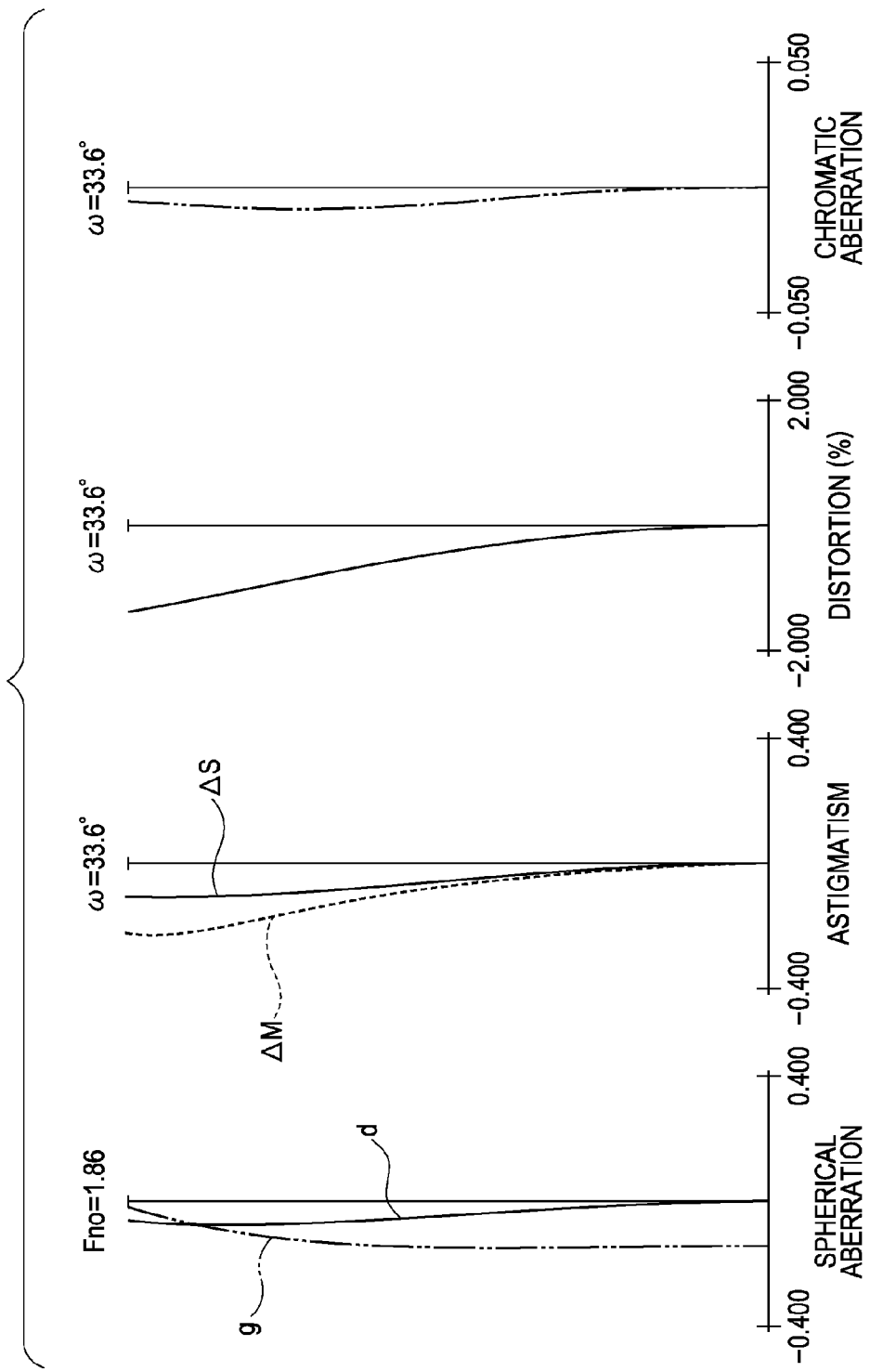

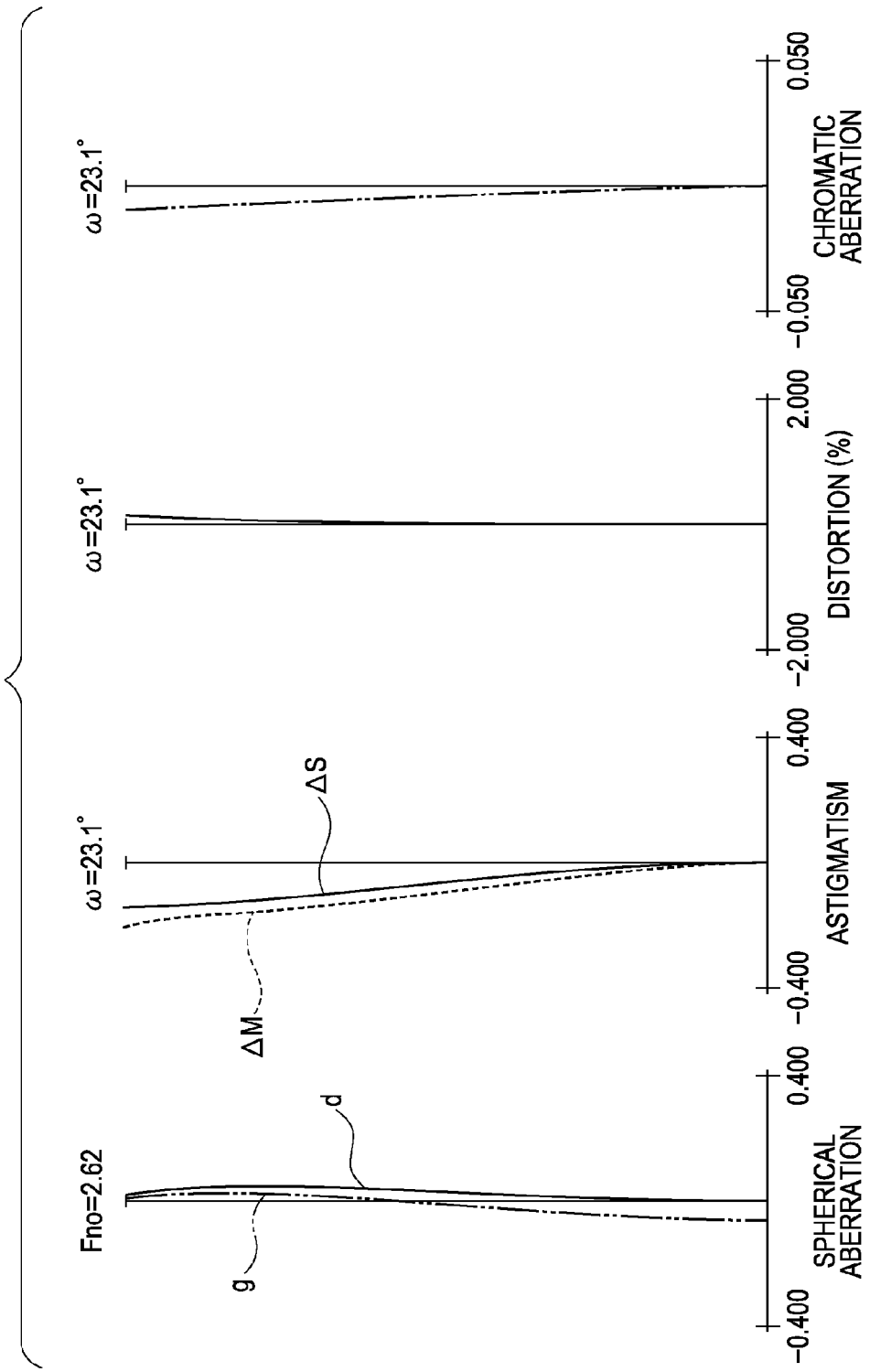

OPTICAL SYSTEM AND OPTICAL APPARATUS INCLUDING THE SAME

BACKGROUND OF THE INVENTION

1. Field of the Invention

The present invention relates an optical system that is suitable for an optical apparatus, for example, a silver salt film camera, a digital still camera, a video camera, a digital video camera, a telescope, a binocular, a projector, or a copier.

2. Description of the Related Art

An optical system that is used in an optical apparatus, such as a digital camera, a video camera, or a projector, is desired to have a wide angle of view and to provide an image without a blur of colors. Also, an optical system that is used in a projector or a single-lens reflex (SLR) camera is desired to have a long back focus.

A retrofocus optical system can easily have a wide angle of view and a long back focus, and hence is frequently used as an image taking optical system or a projection optical system. However, the retrofocus optical system has a refractive power arrangement that is asymmetric about an aperture stop. Lateral chromatic aberration has to be properly corrected.

Typically, in order to correct lateral chromatic aberration in an optical system, a lens made of an anomalous dispersion material is used (see Japanese Patent Laid-Open No. 2001-188172, Japanese Patent Laid-Open No. 2007-178894, U.S. Pat. No. 7,292,398, and U.S. Pat. No. 7,480,102).

However, although the lens made of the anomalous dispersion material is used, it is still difficult to properly correct lateral chromatic aberration that is increased when the angle of view is increased. In particular, to properly correct the lateral chromatic aberration generated because the angle of view is increased, a plurality of lenses that are made of different materials and have predetermined refractive powers have to be arranged at adequate positions in an optical path. If the arrangement is inadequate, it is difficult to properly correct the lateral chromatic aberration when the angle of view is increased.

SUMMARY OF THE INVENTION

According to an aspect of the present invention, an optical system having a larger total lens length than a focal length and including an aperture stop in an optical path includes lenses L and NL on at least one of a magnification conjugate side and a reduction conjugate side with respect to the aperture stop. The lens L satisfies conditional expressions as follows, $$-1.68 \times 10^{-3} \cdot v_L + 0.590 < \theta_L < 3.15 \times 10^{-4} \cdot v_L^2 - 1.86 \times 10^{-2} \cdot v_L + 0.878, \text{ and}$$

$$5 < v_L < 27,$$

where $v_L$ and $\theta_L$ are an Abbe number and a gF-line partial dispersion ratio of a material of the lens L. The lens NL has a refractive power with a sign opposite to a sign of the lens L and is made of a material having a highest gF-line partial dispersion ratio. The lens L has a positive refractive power when the lens L is located at the magnification conjugate side with respect to the aperture stop, or has a negative refractive power when the lens L is located at the reduction conjugate side with respect to the aperture stop. The lenses L and NL satisfy a conditional expression as follows, $$-0.20 < (\theta_{NL} - \theta_L) \cdot \sqrt{(fw \cdot ft)}/f_N \leq -0.03,$$

where $f_N$ is a focal length of one of the lenses L and NL with a negative refractive power, $\theta_{NL}$ is a gF-line partial dispersion ratio of the material of the lens NL, fw is a focal length of the optical system at the wide-angle end, and ft is a focal length of the optical system at the telephoto end, fw and ft being equivalent to f if the optical system has a single focal length f.

With the aspect of the invention, the optical system can be provided, which has a wide angle of view and high optical performance while lateral chromatic aberration is properly corrected in an entire screen.

Further features of the present invention will become apparent to a person of ordinary skill in the art from the following description of exemplary embodiments with reference to the attached drawings.

BRIEF DESCRIPTION OF THE DRAWINGS

FIG. 1 is a cross-sectional view of lenses according to a first embodiment of the invention.

FIGS. 2A and 2B are aberration diagrams at a wide-angle end and a telephoto end according to the first embodiment of the invention.

FIG. 3 is a cross-sectional view of lenses according to a second embodiment of the invention.

FIGS. 6A and 6B are aberration diagrams at a wide-angle end and a telephoto end according to the third embodiment of the invention.

FIG. 7 is a cross-sectional view of lenses according to a fourth embodiment of the invention.

FIGS. 8A and 8B are aberration diagrams at a wide-angle end and a telephoto end according to the fourth embodiment of the invention.

FIGS. 12A and 12B are aberration diagrams at a wide-angle end and a telephoto end according to the sixth embodiment of the invention.

FIGS. 14A and 14B are aberration diagrams at a wide-angle end and a telephoto end according to the seventh embodiment of the invention.

DESCRIPTION OF THE EMBODIMENTS

Desirable embodiments of the invention will be described below in detail with reference to the attached drawings. An optical system according to an embodiment of the invention is an image taking optical system or a projection optical system having a larger total lens length than a focal length, and a single focal length or a zooming function provided with an aperture stop in an optical path. The optical system includes two lenses L and NL arranged on at least one of a magnification conjugate side (an object side, a screen side) and a reduction conjugate side (an image side, an object-to-be-projected side) with respect to the aperture stop. The lenses L and NL have refractive powers with opposite signs, proper Abbe numbers, and proper dispersion ratios.

Figure 4:
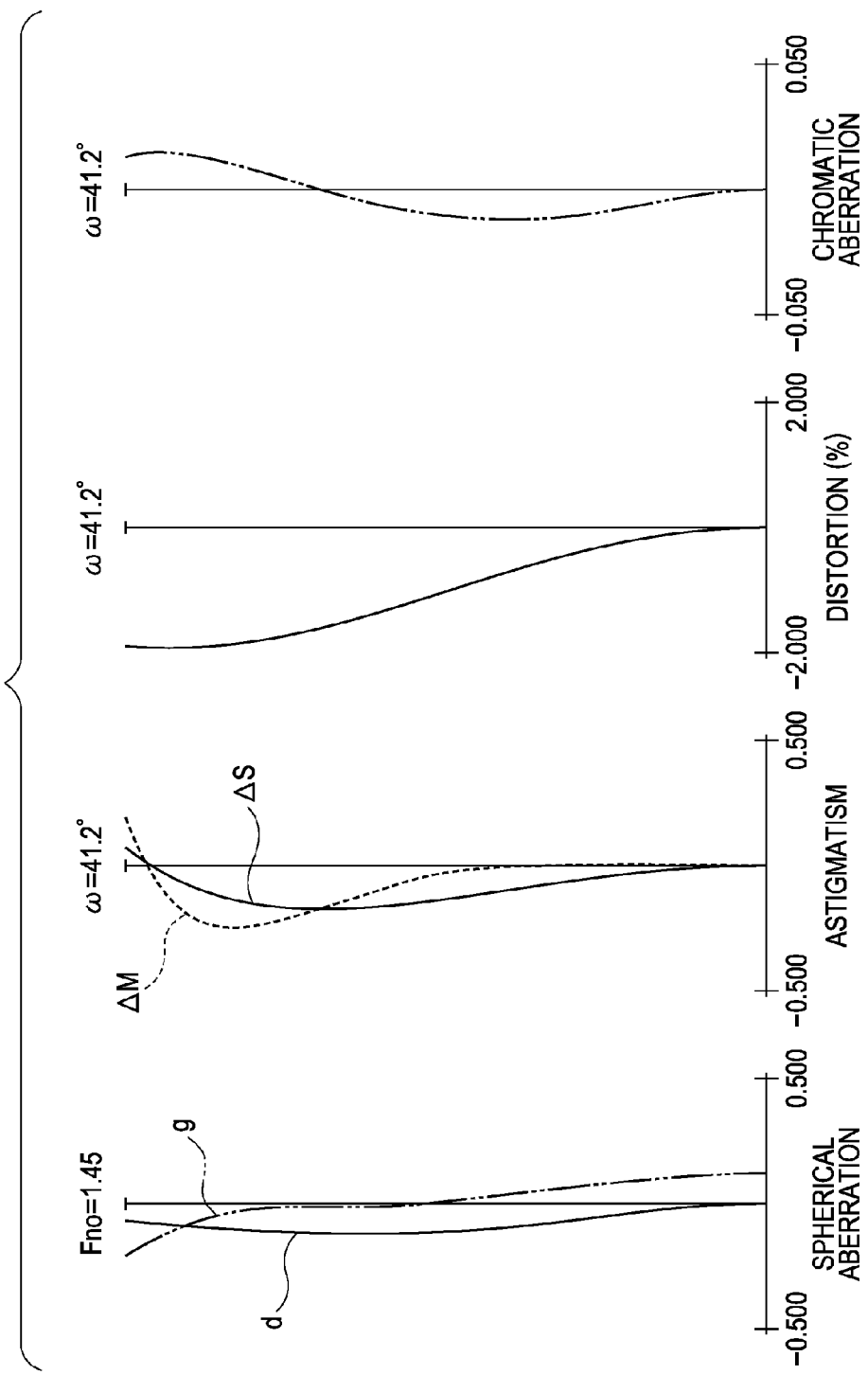
FIG. 4 is an aberration diagram according to the second embodiment of the invention.
Figure 5:
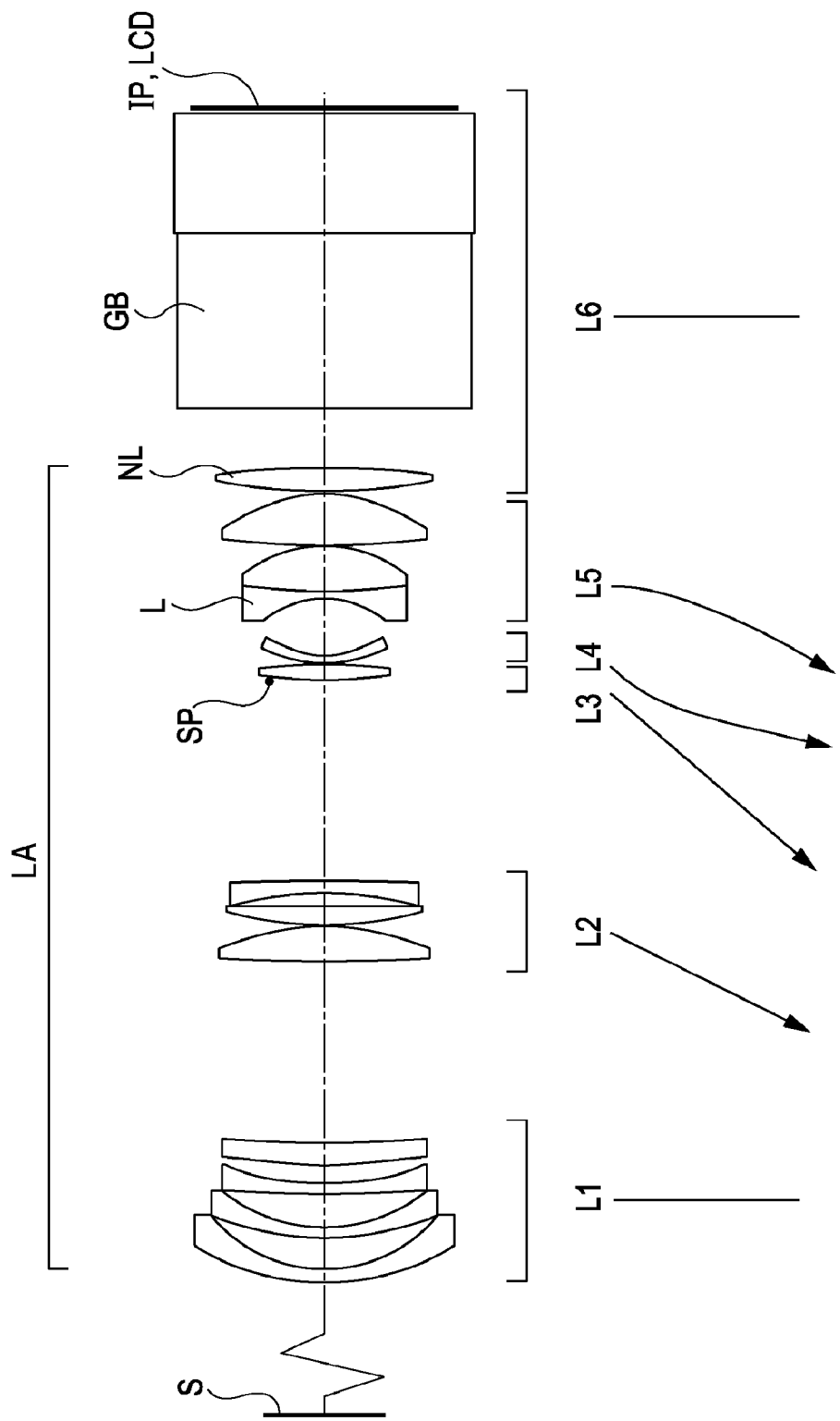
FIG. 5 is a cross-sectional view of lenses according to a third embodiment of the invention.
Figure 6A:
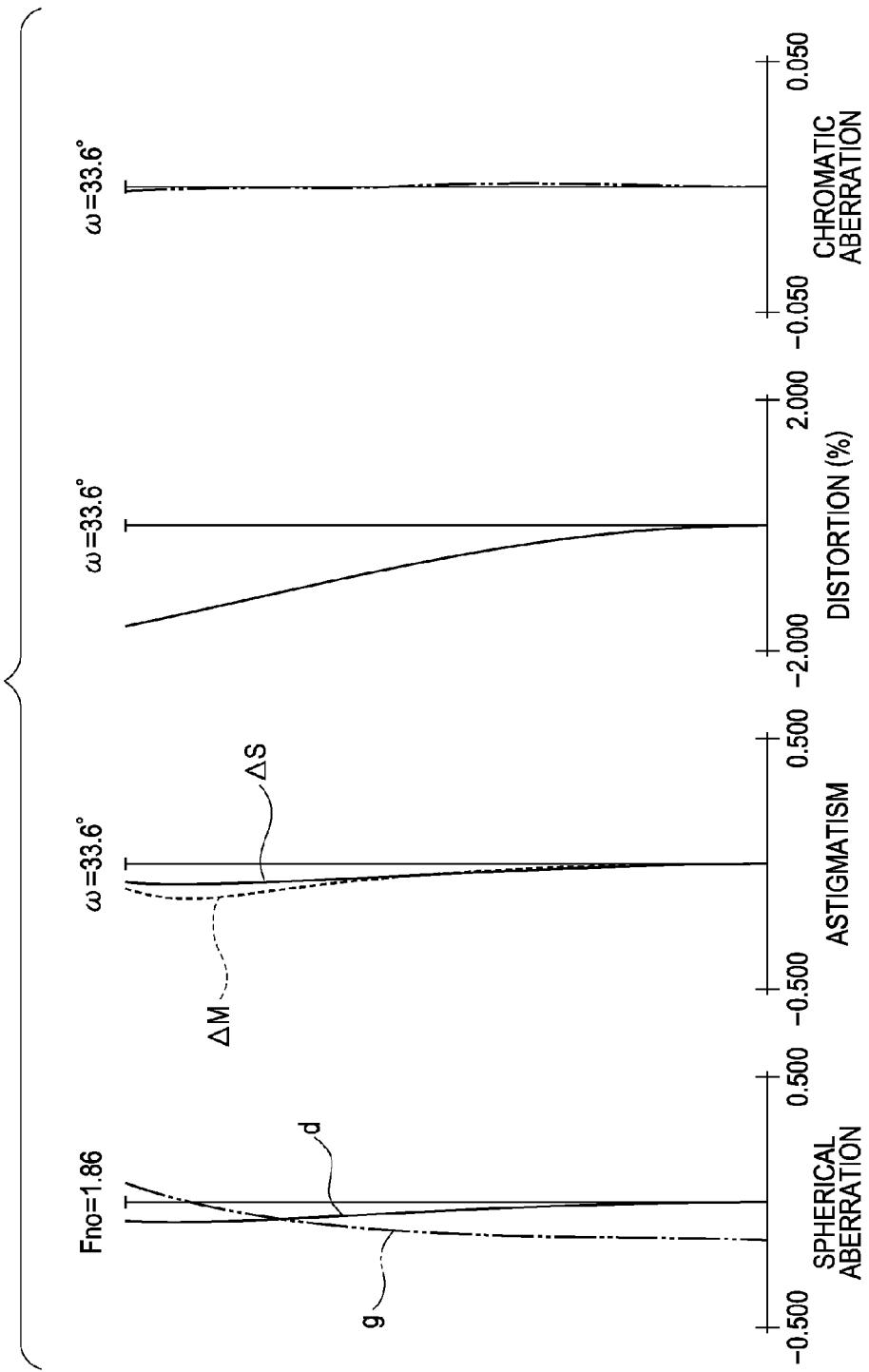

FIG. 1 is a cross-sectional view of lenses at a wide-angle end of an optical system according to a first embodiment of the invention. FIGS. 2A and 2B are longitudinal aberration diagrams at the wide-angle end and a telephoto end, respectively, when a projector distance (a distance from a first lens surface to the screen) of the optical system according to the first embodiment is 2.1 m (which is a distance when a numerical example is expressed in the metric system, the same being applied throughout the remaining of the specification hereinafter). FIG. 3 is a cross-sectional view of lenses of an optical system according to a second embodiment of the invention. FIG. 4 is a longitudinal aberration diagram when an object distance of the optical system according to the second embodiment is infinity. FIG. 5 is a cross-sectional view of lenses at a wide-angle end of an optical system according to a third embodiment of the invention. FIGS. 6A and 6B are longitudinal aberration diagrams at the wide-angle end and a telephoto end when a projector distance of the optical system according to the third embodiment is 2.1 m.

Figure 9:
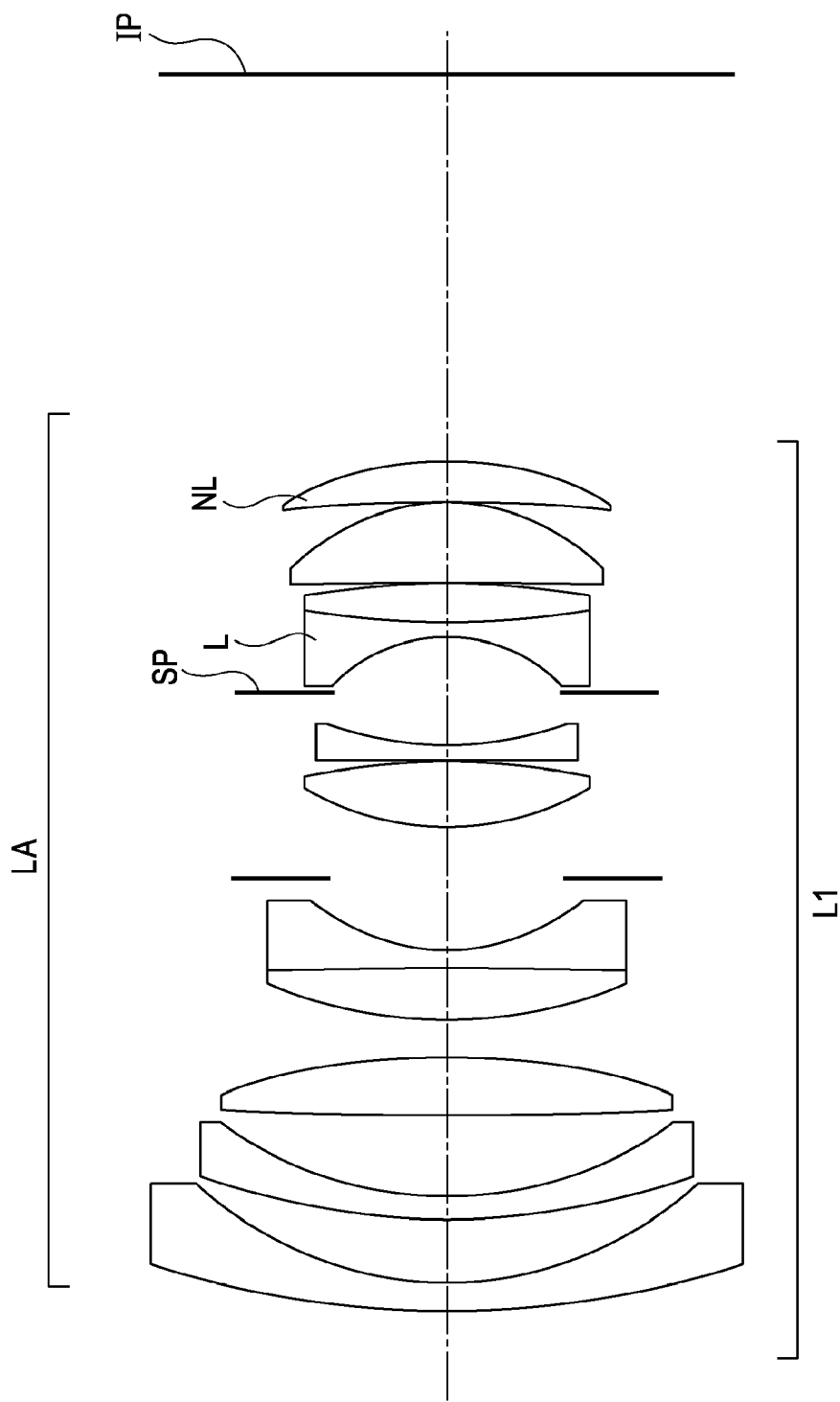
FIG. 9 is a cross-sectional view of lenses according to a fifth embodiment of the invention.
Figure 10:
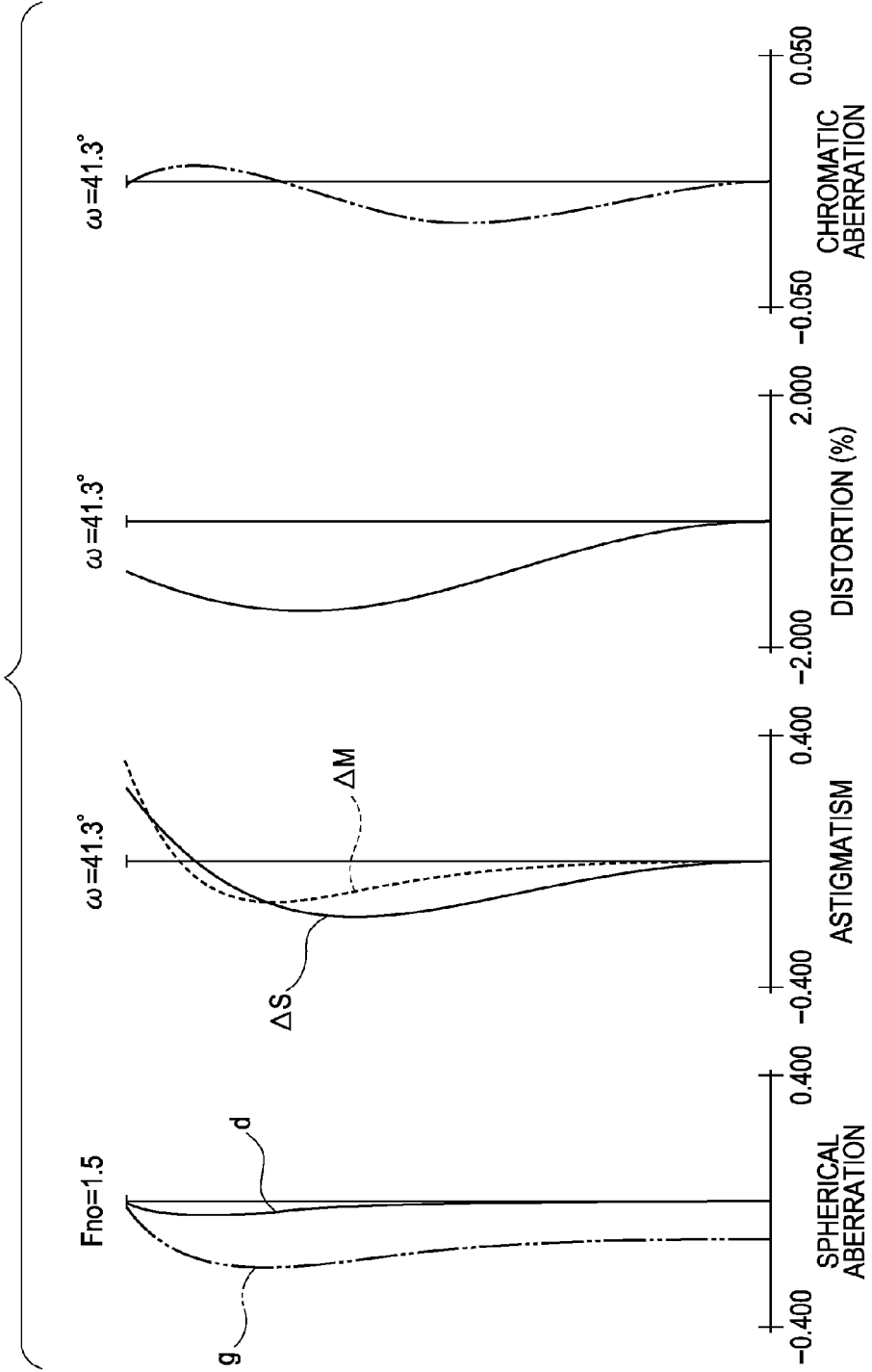
FIG. 10 is an aberration diagram according to the fifth embodiment of the invention.
Figure 11:
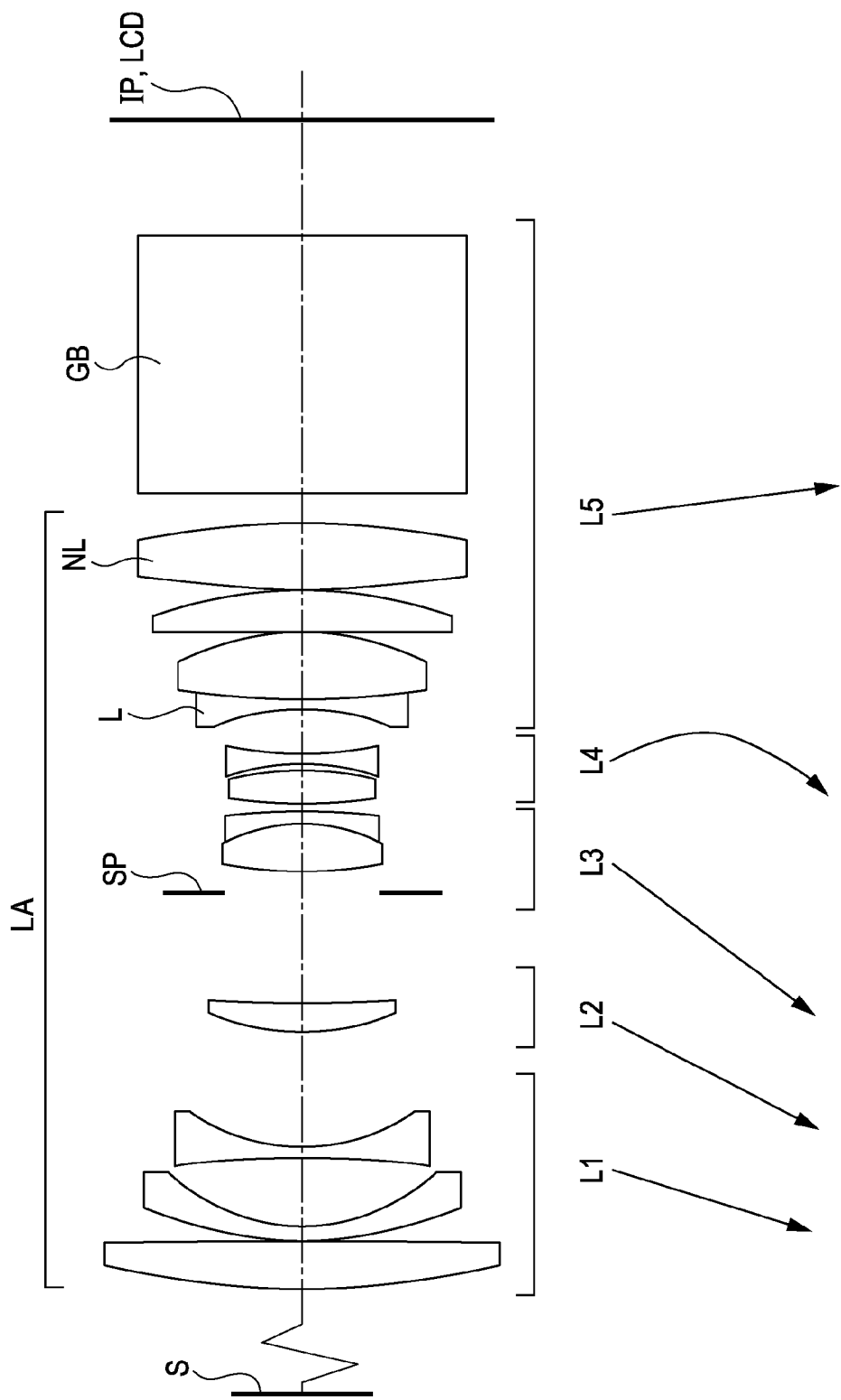
FIG. 11 is a cross-sectional view of lenses according to a sixth embodiment of the invention.
Figure 13:
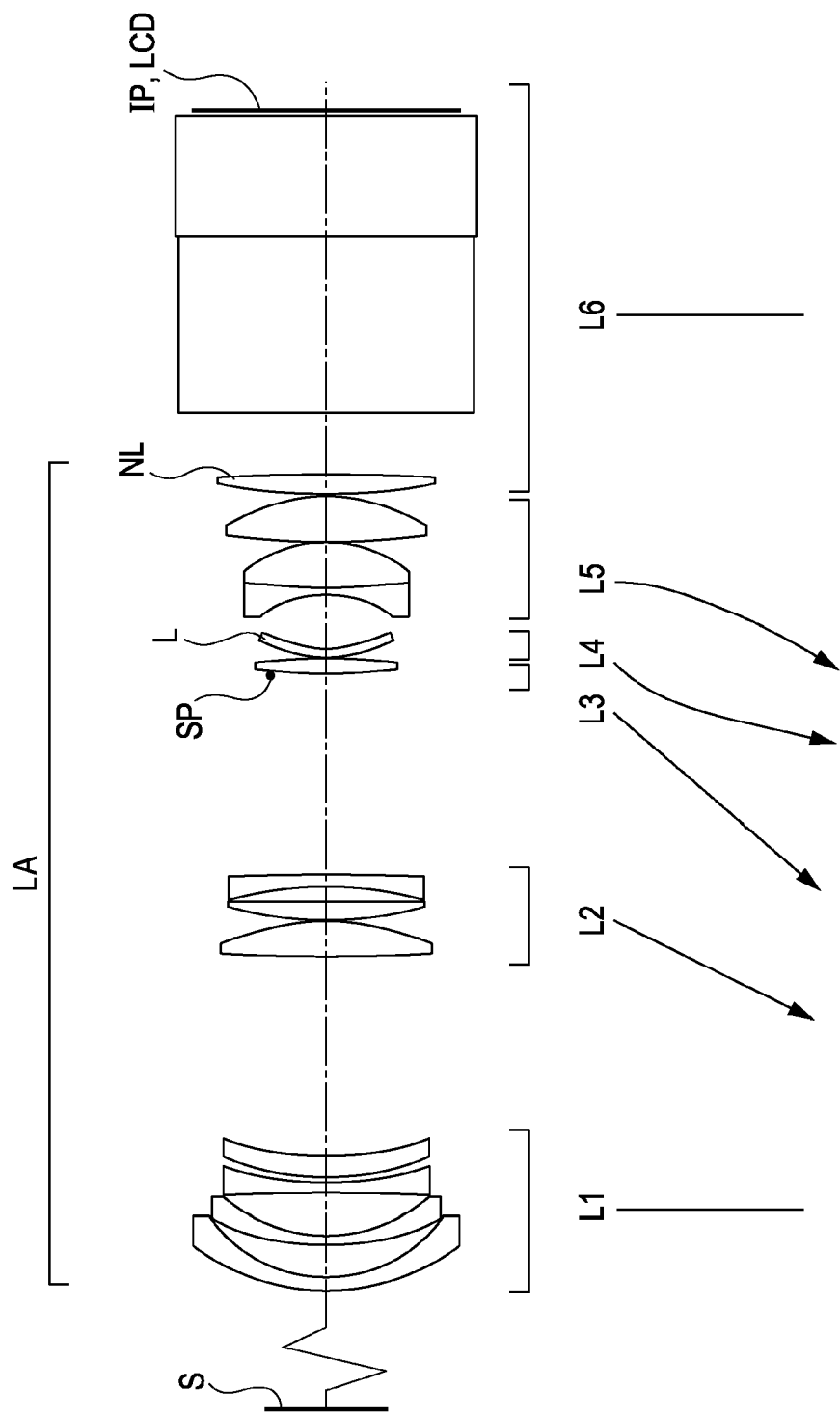
FIG. 13 is a cross-sectional view of lenses according to a seventh embodiment of the invention.

FIG. 7 is a cross-sectional view of lenses at a wide-angle end of an optical system according to a fourth embodiment of the invention. FIGS. 8A and 8B are aberration diagrams at the wide-angle end and a telephoto end when a projector distance is infinity according to the fourth embodiment. FIG. 9 is a cross-sectional view of lenses of an optical system according to a fifth embodiment of the invention. FIG. 10 is a longitudinal aberration diagram when an object distance of the optical system according to the fifth embodiment is infinity. FIG. 11 is a cross-sectional view of lenses at a wide-angle end of an optical system according to a sixth embodiment of the invention. FIGS. 12A and 12B are longitudinal aberration diagrams at the wide-angle end and a telephoto end when a projector distance of the optical system according to the sixth embodiment is 1.2 m. FIG. 13 is a cross-sectional view of lenses at a wide-angle end of an optical system according to a seventh embodiment of the invention. FIGS. 14A and 14B are longitudinal aberration diagrams at the wide-angle end and a telephoto end when a projector distance of the optical system according to the seventh embodiment is 10.0 m.

Figure 15:
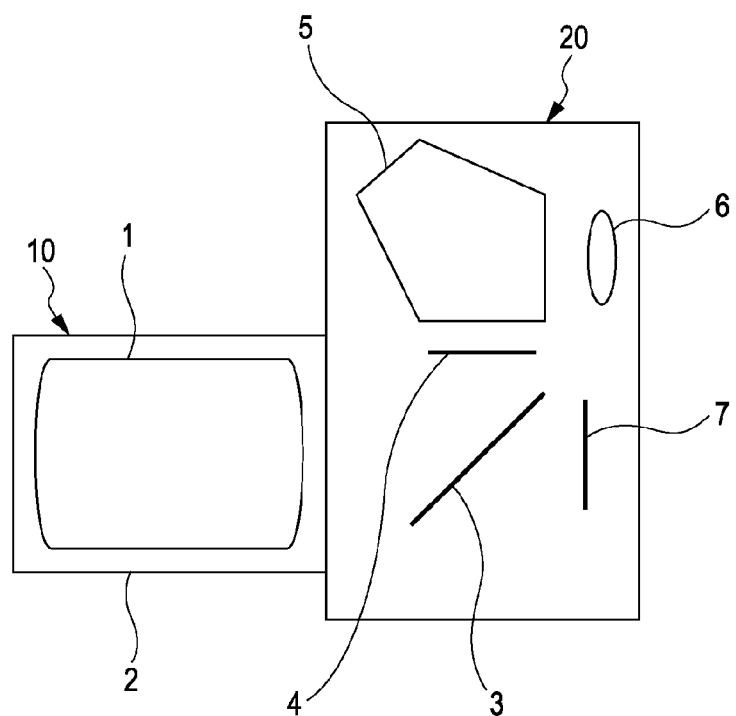
FIG. 15 is an explanatory view of an image pickup apparatus according to an embodiment of the invention.
Figure 16:
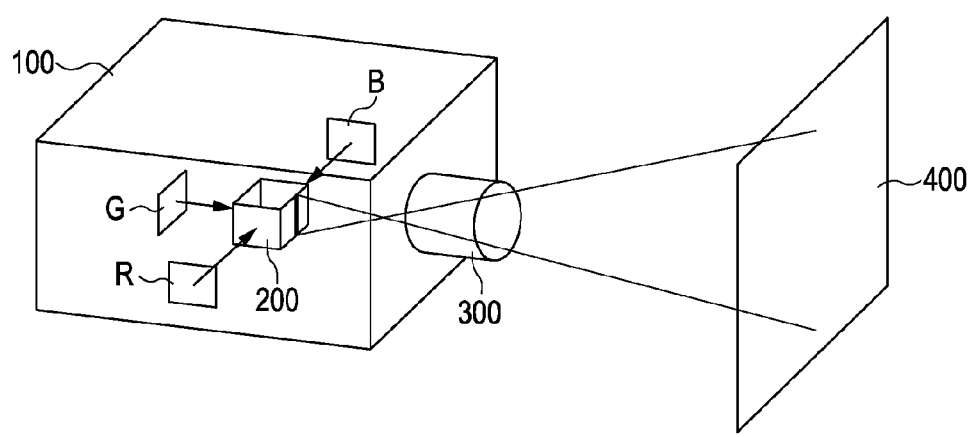
FIG. 16 is an explanatory view of an image projection apparatus according to an embodiment of the invention.

FIG. 15 schematically illustrates a primary portion of an image pickup apparatus according to an embodiment of the invention, the apparatus including the optical system according to corresponding one of the embodiments. FIG. 16 schematically illustrates a primary portion of an image projection apparatus (a projector) according to an embodiment of the invention, the apparatus including the optical system according to corresponding one of the embodiments. The optical systems according to the embodiments each are an image taking lens (an image taking optical system) that is used for an image pickup apparatus, such as a video camera or a digital camera; or a projection lens (a projection optical system) that is used for an image projection apparatus (a projector). In each cross-sectional view of the lenses, the left side is the magnification conjugate side (the object side, front), and the right side is the reduction conjugate side (the image side, rear). When the optical system is used in the projector, the left side is the screen side, and the right side is an image-to-be-projected side (an image display element side). In each cross-sectional view of the lenses, reference sign LA denotes the optical system. The optical system includes a lens system having a single focal length, or a zoom lens having a zooming function.

In addition, in the several drawings and tables described hereinafter, character i denotes an order of a lens unit from the object side. Reference sign Li denotes an i-th lens unit. Reference sign SP denotes an aperture stop. Reference sign IP denotes an image plane corresponding to an original image (an image to be projected) on a solid-state image pickup element (a photoelectric conversion element) that receives an image, or on a liquid crystal panel (the image display element). Reference sign S is a screen surface. Reference sign GB is an optical block corresponding to a prism for separation and combination of colors, an optical filter, a faceplate (a parallel plate glass), a quartz low pass filter, an infrared cut filter, etc. Arrows projecting away from a given reference sign Li indicate movement directions (movement loci) of the i-th lens unit during zooming from the wide-angle end to the telephoto end. A straight (orthogonal) line connecting to a reference sign Li indicates that the i-th lens unit does not move during zooming from the wide-angle end to the telephoto end. When the optical system is a zoom optical system that can provide zooming, the wide-angle end and the telephoto end are zoom positions at both ends of a range in which a lens unit for zooming is mechanically movable along an optical axis (shown as a dash-dotted line in the figures).

The optical system in any of FIGS. 1, 5, and 13 includes a first lens unit with a negative refractive power, a second lens unit with a positive refractive power, a third lens unit with a positive refractive power, a fourth lens unit with a negative refractive power, a fifth lens unit with a positive refractive power, and a sixth lens unit with a positive refractive power, in order from the magnification conjugate side to the reduction conjugate side. The optical system is a projection optical system (a zoom lens) in which the first and sixth lens units are not moved during zooming, but the second to fifth lens units are moved during zooming. The optical system in FIG. 7 includes a first lens unit with a negative refractive power, a second lens unit with a positive refractive power, a third lens unit with a positive refractive power, a fourth lens unit with a negative refractive power, and a fifth lens unit with a positive refractive power, in order from the object side to the image side. The optical system is an image taking optical system (a zoom lens) in which all lens units are moved during zooming. The optical system in FIG. 11 has a refractive power arrangement similar to the optical system in FIG. 7. The optical system in FIG. 11 is a projection optical system (a zoom lens) in which a first lens unit is not moved during zooming, but second to fifth lens units are moved during zooming. The optical system in FIG. 3 or 9 is an image taking optical system having a single focal length.

In the aberration diagrams, reference signs d and g respectively denote the d-line and g-line. Reference signs $\Delta M$ and $\Delta S$ respectively denote a meridional image plane and a sagittal image plane. Lateral chromatic aberration is represented with the g-line. Reference sign Fno is an F-number, and $\omega$ is a half angle of view. The aberration diagrams each use scales of 0.5 or 0.4 mm for spherical aberration, 0.5 or 0.4 mm for astigmatism, 2% for distortion, and 0.05 mm for lateral chromatic aberration. The optical system LA in each embodiment has a configuration that satisfies the following predetermined conditional expressions. The optical system LA has a larger total lens length (a distance from a lens surface at the most magnification side to an image plane) than a focal length (a focal length at the wide-angle end in the case of a zoom lens), and an aperture stop SP in an optical path. The optical system LA includes a lens L arranged on at least one of the magnification conjugate side and the reduction conjugate side with respect to the aperture stop SP. The lens L satisfies conditional expressions as follows:

$$-1.68\times10^{-3}\cdot v_L+0.590<\theta_L<3.15\times10^{-4}\cdot v_L^2-1.86\times10^{-2}\cdot v_L+0.878 \quad (1), \text{ and}$$

$$5<v_L<27 \quad (2),$$

where $v_L$ is an Abbe number of a material of the lens L, and $\theta_L$ is a gF-line partial dispersion ratio of the lens L.

The optical system LA also includes a lens NL that has a power (a refractive power) with a sign opposite to a sign of the lens L and that is made of a material having a highest gF-line partial dispersion ratio. Both the lenses L and NL are arranged in the optical path, on at least one of the magnification conjugate side (a magnification side) and the reduction conjugate side (a reduction side) with respect to the aperture stop SP. The lens L has a positive refractive power when the lens L is located at the magnification conjugate side with respect to the aperture stop SP, or has a negative refractive power when the lens L is located at the reduction conjugate side with respect to the aperture stop SP. At this time, a conditional expression is satisfied as follows:

$$-0.20<(\theta_{NL}-\theta_L)\cdot\sqrt{(fw\cdot ft)}/f_N\leq-0.03 \quad (3),$$

where $f_N$ is a focal length of one of the lenses L and NL with a negative refractive power, $\theta_{NL}$ is a gF-line partial dispersion ratio of a material of the lens NL, fw is a focal length of the optical system at the wide-angle end, and ft is a focal length of the optical system at the telephoto end (if the optical system has a single focal length f, fw and ft are equivalent to f).

Herein, an Abbe number (an Abbe number with respect to the d-line) $v$ and the gF-line partial dispersion ratio $\theta$ are determined as follows:

$$v=(N_d-1)/(N_F-N_C), \text{ and}$$

$$\theta=(N_g-N_F)/(N_F-N_C),$$

where $N_g$, $N_d$, $N_F$, and $N_C$ are refractive indices of a material respectively for the g-line (wavelength=435.8 nm), the F-line (wavelength=486.1 nm), the d-line (wavelength=587.6 nm), and the C-line (wavelength=656.3 nm).

The focal length is a focal length for the d-line (the same apply hereinafter). The optical system having the larger total lens length than the focal length is an optical system in which a lens unit with a high negative refractive power is arranged at the magnification conjugate side to arrange a principal point position at the reduction conjugate side. Such an optical system is a retrofocus optical system. With this configuration, it is difficult to correct lateral chromatic aberration that is generated at the lens unit with the high negative refractive power. Owing to this premise, when the lens L is used at the magnification side with respect to the aperture stop SP, the lens L has a positive refractive power, and the lens NL with a negative refractive power is arranged at the same side as the lens L. In contrast, when the lens L is used at the reduction side with respect to the aperture stop SP, the lens L has a negative refractive power, and the lens NL with a positive refractive power is arranged at the same side as the lens L. Accordingly, the lateral chromatic aberration is properly corrected.

Conditional expressions (1) and (2) determine the material of the lens L. In particular, Conditional expression (1) determines the relationship between the Abbe number and the partial dispersion ratio of the material of the lens L. Anomalous dispersion may be insufficient or excessive if the value of Conditional expression (1) exceeds the upper or lower limit. It may be difficult to correct secondary lateral chromatic aberration. More preferably, Conditional expression (1) may be Conditional expression (1a) as follows:

$$-1.68\times10^{-3}\cdot v_L+0.600<\theta_L<3.15\times10^{-4}\cdot v_L^2-1.86\times10^{-2}\cdot v_L+0.878 \quad (1a).$$

Accordingly, an optical system that can properly correct lateral chromatic aberration in a short wavelength region can be provided.

Conditional expression (2) determines the Abbe number of the material of the lens L for the d-line. Correction for primary chromatic aberration may be insufficient or excessive if the Abbe number of the material of the lens L, which has a predetermined refractive power for correcting aberration other than the chromatic aberration, exceeds the upper or lower limit. More preferably, Conditional expression (2) may be Conditional expression (2a) as follows:

$$15<v_L<27 \quad (2a).$$

Accordingly, an optical system that can further properly correct the chromatic aberration can be provided.

Conditional expression (3) determines achromatic performance of the lenses L and NL for a secondary spectrum. Conditional expression (3) determines the anomalous dispersion and the relationship between the refractive powers. Correction for secondary chromatic aberration may be insufficient or excessive if the value of Conditional expression (3) exceeds the upper or lower limit. More preferably, Conditional expression (3) may be Conditional expression (3a) as follows:

$$-0.150<(\theta_{NL}-\theta_L)\cdot\sqrt{(fw\cdot ft)}/f_N\leq-0.03 \quad (3a).$$

Accordingly, an optical system that can further properly correct the secondary chromatic aberration can be provided.

As described above, particularly for the optical system that has the larger total lens length than the focal length, the optical system that can properly correct the lateral chromatic aberration even if the angle of view is increased can be provided. The optical system that is a feature of the invention can be provided by satisfying the above-described configurations. The optical system may satisfy at least one of conditional expressions described below. At this time, when $f_L$ is a focal length of the lens L, and $\Delta\theta_L$ is an anomalous partial dispersion ratio of the material of the lens L, the anomalous partial dispersion ratio $\Delta\theta_L$ is determined as follows:

$$\Delta\theta_L=\theta_L-(-0.001682\cdot v_L+0.6438).$$

Then, the at least one of the following conditional expressions may be satisfied:

$$-0.026<\Delta\theta_L\cdot\sqrt{(fw\cdot ft)}/|f_L|<0.009 \quad (4),$$

$$1.0<|f_{NL}|/\sqrt{(fw\cdot ft)}|<6.0 \quad (5),$$

$$0.79<\theta_{NL}-(1.0\times10^{-4}\cdot v_{NL}^2-9.1\times10^{-3}\cdot v_{NL})<1.00 \quad (6),$$

$$1.7<N_{NL}<2.3 \quad (7), \text{ and}$$

$$0.00<|L/L_f|<0.55 \quad (8),$$

where $f_{NL}$ is a focal length of the lens NL, $v_{NL}$ is an Abbe number of the material of the lens NL, $N_{NL}$ is a refractive index of the material of the lens NL, and L and $L_f$ are respectively a distance from a lens surface vertex of a lens located at the most magnification conjugate side to the lens L and a distance from the lens L to the aperture stop SP when the lens L is arranged at the magnification conjugate side with respect to the aperture stop SP.

Conditional expression (4) determines the relationship between the partial dispersion ratio of the material of the lens L and the focal length of the lens L. The correction for the secondary chromatic aberration may be insufficient or excessive if the value of Conditional expression (4) exceeds the upper or lower limit. More preferably, Conditional expression (4) may be Conditional expression (4a) as follows:

$$-0.020 < \Delta\theta_L \cdot \sqrt{(fw \cdot ft)}/|f_L| < 0.0091 \tag{4a}$$

Accordingly, an optical system that can further properly correct the chromatic aberration can be provided.

Conditional expression (5) determines the focal length of the lens NL corresponding to a situation in which the lens NL has the negative refractive power when the lens NL is located at the magnification side with respect to the aperture stop SP, or a situation in which the lens NL has the positive refractive power when the lens NL is located at the reduction side. If the value of Conditional expression (5) exceeds the lower limit, the refractive power becomes too high, and hence it is difficult to correct the primary lateral chromatic aberration. If the value exceeds the upper limit, the correction performance for the secondary chromatic aberration may be insufficient. More preferably, Conditional expression (5) may be Conditional expression (5a) as follows:

$$1.4 < |f_{NL}|/\sqrt{(fw \cdot ft)}| < 4.5 \tag{5a}$$

Accordingly, an optical system that can further properly correct the chromatic aberration can be provided.

Conditional expression (6) determines the relationship between the partial dispersion ratio and the Abbe number of the lens NL. The correction for the chromatic aberration may be insufficient or excessive if the value of Conditional expression (6) exceeds the upper or lower limit. More preferably, Conditional expression (6) may be Conditional expression (6a) as follows:

$$0.80 < \theta_{NL} - (1.0 \times 10^{-4} \cdot v_{NL}^2 - 9.1 \times 10^{-3} \cdot v_{NL}) < 0.95 \tag{6a}$$

Accordingly, an optical system that can properly correct lateral chromatic aberration in a short wavelength region can be provided.

Conditional expression (7) determines the refractive index of the material of the lens NL for the d-line. If the value of Conditional expression (7) exceeds the lower limit, it may be difficult to correct distortion and color distortion generated by the lens NL that provides a high refractive power for the correction for the secondary chromatic aberration. If a material that exceeds the upper limit of Conditional expression (7) is selected, the refractive power of the lens NL becomes too high, and it may be difficult to correct the lateral chromatic aberration. More preferably, Conditional expression (7) may be Conditional expression (7a) as follows:

$$1.7 < N_{NL} < 2.0 \tag{7a}$$

Accordingly, an optical system that is suitable for correcting the chromatic aberration can be provided.

In the optical system having the larger total lens length than the focal length, the lens unit with the high negative refractive power is arranged at the magnification side. Hence, a height of a paraxial chief ray incident on a lens surface is increased and a height of a paraxial marginal ray incident on a lens surface is decreased, as the lens is located closer to the most magnification conjugate side. When the lens L is used at the magnification side with respect to the aperture stop SP, the lens L may be arranged closer to the most magnification side. Accordingly, the longitudinal chromatic aberration can be properly corrected while the longitudinal chromatic aberration is not affected. Conditional expression (8) determines the position of the lens L in the optical path. If the value of Conditional expression (8) exceeds the upper limit, the secondary longitudinal chromatic aberration may be increased.

More preferably, Conditional expression (8) may be as follows:

$$0.00 < |L/L_f| < 0.52 \tag{8a}$$

Next, specific lens configurations of the optical systems according to the respective embodiments will be described.

First Embodiment

The optical system in FIG. 1 according to the first embodiment is described. The first embodiment is an example in which the optical system is applied to a projection optical system (an image projection optical system) used in a projector. The optical system in the first embodiment is a zoom lens including six lens units in order from the magnification side (the magnification conjugate side) to the reduction side (the reduction conjugate side). In particular, the zoom lens includes a first lens unit L1 with a negative refractive power, a second lens unit L2 with a positive refractive power, a third lens unit L3 with a positive refractive power, a fourth lens unit L4 with a negative refractive power, a fifth lens unit L5 with a positive refractive power, and a sixth lens unit L6 with a positive refractive power. The second to fifth lens units L2 to L5 are moved to the magnification side during zooming from the wide-angle end to the telephoto end. Accordingly, a zoom ratio of about 1.65 is provided. The first and sixth lenses L1 and L6 are not moved during zooming. Focusing when a projector distance is changed is performed by moving the first lens unit L1. In this embodiment, a positive lens L made of a high dispersion material is arranged at the most reduction side and a negative lens NL made of a material having a high partial dispersion ratio to the positive lens L is arranged at the most magnification side in the first lens unit L1. The positive lens L corrects primary lateral chromatic aberration generated by the negative lens NL, and corrects bend of secondary lateral chromatic aberration. Typically, the material of a negative lens included in a first lens unit with a negative refractive power uses a low dispersion material. However, the material of the negative lens NL intentionally uses the high dispersion material. Thus, a phenomenon unique to the retrofocus optical system, in which lateral chromatic aberration with short wavelengths in a wide angle region bends in a peripheral portion of a screen to be increased, is recovered such that the lateral chromatic aberration bends to be decreased. In addition, the negative lens NL is made of the material with the high anomalous dispersion, so as to have a high refractive power. Thus, the secondary lateral chromatic aberration, in particular, bend of the g-line, in the peripheral portion of the screen in the wide angle region is corrected.

Second Embodiment

The optical system in FIG. 3 according to the second embodiment is described. The second embodiment is an example in which the optical system is applied to an image taking optical system used in a single-lens reflex camera. The optical system in the second embodiment is a retrofocus image taking optical system having a single focal length. The optical system includes a lens unit with a high negative refractive power at the object side. In the second embodiment, a positive lens L that is a fourth lens when counted from the object side to the image side is made of a high dispersion material. Thus, the positive lens L has a high power. Also, a negative lens NL at the most object side is made of a material having a high partial dispersion ratio to the positive lens L. The positive lens L corrects primary lateral chromatic aberration generated by the negative lens NL, and corrects bend of secondary lateral chromatic aberration. As described above, in a case in which the positive lens L is arranged at the object side with respect to the aperture stop SP, the positive lens L may be arranged at a position as far as possible from the aperture stop SP so that the positive lens L satisfies Conditional expression (8). Accordingly, the height of an axial ray can be low and the height of an oblique ray can be high. The lateral chromatic aberration can be effectively corrected while the longitudinal chromatic aberration is not substantially affected. The other configuration is similar to that of the first embodiment.

Third Embodiment

The optical system in FIG. 5 according to the third embodiment is described. The third embodiment is an example in which the optical system is applied to a projection optical system used in a projector, similarly to the first embodiment. The zoom type and the focus method of the projection optical system according to the third embodiment are similar to those of the first embodiment. The projection optical system of the third embodiment has a zoom ratio of about 1.6. In this embodiment, a fifth lens unit L5 is arranged at the reduction side with respect to an aperture stop SP and has a positive refractive power. The fifth lens unit L5 includes a negative lens L. The negative lens L is arranged at the most magnification side in the fifth lens unit L5 and made of a high dispersion material. Thus, the negative lens L has a high power. Also, a sixth lens unit L6 with a positive refractive power includes a positive lens NL made of a material having a high partial dispersion ratio to the negative lens L. The negative lens L corrects primary lateral chromatic aberration generated by the positive lens NL, and corrects bend of secondary lateral chromatic aberration. Typically, a positive lens included in a lens unit with a positive refractive power is made of a low dispersion material. However, the material of the positive lens NL intentionally uses a high dispersion material. Thus, a phenomenon in the retrofocus optical system, in which lateral chromatic aberration with short wavelengths in a wide angle region bends in a peripheral portion of a screen to be increased, is recovered such that the lateral chromatic aberration bends to be decreased. In addition, the positive lens NL is made of the material with the high anomalous dispersion, so as to have a high refractive power. Thus, the secondary lateral chromatic aberration, in particular, bend of the g-line, in the peripheral portion of the screen in the wide angle region is corrected. The other configuration is similar to that of the first embodiment.

Fourth Embodiment

The optical system in FIG. 7 according to the fourth embodiment is described. The fourth embodiment is an example in which the optical system is applied to an image taking optical system used in a single-lens reflex camera, similarly to the second embodiment. The optical system in the fourth embodiment is a zoom lens including five lens units in order from the object side to the image side. In particular, the zoom lens includes a first lens unit L1 with a negative refractive power, a second lens unit L2 with a positive refractive power, a third lens unit L3 with a positive refractive power, a fourth lens unit L4 with a negative refractive power, and a fifth lens unit L5 with a positive refractive power. Zooming is performed by moving all lens units including the first to fifth lens units L1 to L5. Focusing is performed by moving the second lens unit L2. In this embodiment, the fifth lens unit L5 is arranged at the image side with respect to an aperture stop SP. The fifth lens unit L5 includes a negative lens L made of a high dispersion material. Thus, the negative lens L has a high power. Also, the fourth lens unit L4 includes a positive lens NL made of a material having a high partial dispersion ratio to the negative lens L. The negative lens L corrects primary lateral chromatic aberration generated by the positive lens NL, and corrects bend of secondary lateral chromatic aberration. The other configuration is similar to that of the third embodiment.

Fifth Embodiment

The optical system in FIG. 9 according to the fifth embodiment is described. The fifth embodiment is an example in which the optical system is applied to an image taking optical system used in a single-lens reflex camera, similarly to the second embodiment. The lens type of the image taking optical system according to the fifth embodiment is similar to that of the second embodiment. In this embodiment, when counted from the object side, an eighth negative lens L arranged at the image side with respect to the aperture stop SP is made of a high dispersion material. Thus, the negative lens L has a high power. Also, a positive lens NL at the most image side is made of a material having a high partial dispersion ratio to the negative lens L. The negative lens L corrects primary lateral chromatic aberration generated by the positive lens NL, and corrects bend of secondary lateral chromatic aberration. The other configuration is similar to that of the third embodiment.

Sixth Embodiment

The optical system in FIG. 11 according to the sixth embodiment is described. The sixth embodiment is an example in which the optical system is applied to a projection optical system used in a projector, similarly to the first embodiment. The optical system in the sixth embodiment is a zoom lens including five lens units in order from the magnification side to the reduction side. In particular, the zoom lens includes a first lens unit L1 with a negative refractive power, a second lens unit L2 with a positive refractive power, a third lens unit L3 with a positive refractive power, a fourth lens unit L4 with a negative refractive power, and a fifth lens unit L5 with a positive refractive power. The first to third lens units L1 to L3 are moved to the magnification side, the fourth lens unit L4 is moved along a locus protruding toward the reduction side, and the fifth lens unit L5 is moved to the reduction side, during zooming from the wide-angle end to the telephoto end. Accordingly, a zoom ratio of about 1.3 is provided. Focusing when a projector distance is changed is performed by moving the first lens unit L1. In this embodiment, the fifth lens unit L5 is arranged at the reduction side with respect to an aperture stop SP. The fifth lens unit L5 includes a negative lens L that is arranged at the most magnification side in the fifth lens unit L5 and is made of a high dispersion material. Thus, the negative lens L has a high power. Also, the fifth lens unit L5 includes a positive lens NL that is arranged at the most reduction side in the fifth lens unit L5 and made of a material having a high partial dispersion ratio to the negative lens L. The negative lens L corrects primary lateral chromatic aberration generated by the positive lens NL, and corrects bend of secondary lateral chromatic aberration. The other configuration is similar to that of the third embodiment.

Seventh Embodiment

The optical system in FIG. 13 according to the seventh embodiment is described. The seventh embodiment is an example in which the optical system is applied to a projection optical system used in a projector, similarly to the first embodiment. The zoom type and the focus method of the projection optical system according to the seventh embodiment are similar to those of the first embodiment. The projection optical system of the seventh embodiment has a zoom ratio of about 1.6. In this embodiment, a fourth lens unit L4 is arranged at the reduction side with respect to an aperture stop SP. The fourth lens unit L4 includes a negative lens L made of a high dispersion material (vd=17.2). Thus, the negative lens L has a high power. Also, a sixth lens unit L6 includes a positive lens NL made of a material having a high partial dispersion ratio to the negative lens L. The negative lens L corrects primary lateral chromatic aberration generated by the positive lens NL, and corrects bend of secondary lateral chromatic aberration. The other configuration is similar to that of the third embodiment.

The optical systems according to the respective embodiments each may be used for a projection optical system in a projector or an image taking optical system in an image pickup apparatus. The embodiments of the present invention have been described above. However, the present invention is not limited thereto, and may be modified or changed in various manners within the scope of the present invention.

Next, an embodiment, in which the optical system according to corresponding one of the embodiments of the present invention is applied to an image pickup apparatus (a camera system, an optical apparatus), will be described with reference to FIG. 15. Referring to FIG. 15, an image taking lens 10 includes an optical system 1 according to any of the second, fourth, and fifth embodiments. The optical system 1 is held by a lens barrel 2 serving as a holding member. A camera body 20 includes a quick return mirror 3, a focusing plate 4, and a pentagonal roof prism 5. The quick return mirror 3 reflects light beams from the image taking lens 10 upward. The focusing plate 4 is arranged at an image formation position of the image taking lens 10. The pentagonal roof prism 5 converts an inverted image formed on the focusing plate 4 into an erect image. The camera body 20 also includes an eyepiece 6 or the like for observing the erect image. The camera body 20 further includes a photosensitive surface 7. For example, a solid-state image pickup element (a photoelectric conversion element), such as a CCD sensor or a CMOS sensor, or a silver salt film is arranged at the photosensitive surface 7. When an image is taken, the quick return mirror 3 is retracted from an optical path, and an image is formed on the photosensitive surface 7 by the image taking lens 10.

Next, an embodiment, in which the optical system according to corresponding one of the embodiments of the present invention is applied to a projection apparatus (, an image projection apparatus, a projector), will be described with reference to FIG. 16. FIG. 16 illustrates a projection apparatus when any of the optical systems according to the first, third, sixth, and seventh embodiments of the present invention is applied to a three-plate color liquid crystal projector. In the projection apparatus, a color combining unit combines a plurality of pieces of image information for color lights corresponding to a plurality of liquid crystal display elements. Then, a projecting lens projects the combined image information on a screen surface in an enlarged manner. In particular, referring to FIG. 16, a color liquid crystal projector 100 includes a prism 200 serving as the color combining unit configured to combine color lights from three panels R, G, and B of red, green, and blue, respectively. Then, the color lights are combined into a single optical path, and the combined color light is projected by a projection lens 300, which is the aforementioned optical system, onto a screen 400. As described above, by applying the optical system according to corresponding one of the first to seventh embodiments to, for example, a digital camera or a projector, a projection apparatus (an optical apparatus) with high optical performance can be provided.

Next, data of numerical examples according to the respective embodiments of the present invention will be provided below. In each of the numerical examples, reference sign i denotes an order of a surface when counted from the object side (the magnification conjugate side), $r_i$ denotes a curvature radius of a lens surface, $d_i$ denotes a lens thickness or an air gap between an i-th surface and an (i+1)-th surface, $nd_i$ is a refractive index for the d-line, and $vd_i$ is an Abbe number for the d-line. Also, reference sign $\theta gF_i$ is a partial dispersion ratio between the g-line and the F-line. A glass block GB arranged at the most image side corresponds to a color combining prism or the like. Reference signs k, A4, A6, A8, A10, and A12 are aspherical coefficients. When x represents a displacement along an optical axis at a height h from the optical axis with reference to a surface vertex, an aspherical shape is defined by an expression as follows:

$$x=(h^2/R)/[1+\{1-(1+k)(h/R)^2\}^{1/2}]+A4h^4+A6h^6+A8h^8+A10h^{10}+A12h^{12},$$

where R is a curvature radius.

Also, the relationship between the respective embodiments and the numerical values obtained by the conditional expressions will be shown in Table 1.

Numerical Example 1

Unit mm

Surface data

| Surface No. | r | d | nd | vd | Effective diameter | θgF |
|---|---|---|---|---|---|---|
| 1 | 35.575 | 2.20 | 1.77071 | 23.0 | 39.95 | 0.668 |
| 2 | 20.522 | 7.86 | | | 33.86 | |
| 3* | 102.662 | 3.15 | 1.48749 | 70.2 | 33.49 | |
| 4* | 30.425 | 14.95 | | | 31.24 | |
| 5 | −25.534 | 2.00 | 1.61800 | 63.3 | 29.75 | |
| 6 | −88.289 | 0.48 | | | 31.89 | |
| 7 | −70.345 | 3.75 | 1.84660 | 23.5 | 31.94 | 0.596 |
| 8 | −51.592 | (Variable) | | | 33.44 | |
| 9 | 467.918 | 4.07 | 1.83400 | 37.2 | 35.46 | |
| 10 | −68.204 | (Variable) | | | 35.70 | |
| 11 | 59.634 | 3.86 | 1.74400 | 44.8 | 33.33 | |
| 12 | −746.746 | 10.22 | | | 33.03 | |
| 13(Aperture stop) | ∞ | (Variable) | | | 28.41 | |
| 14 | −39.341 | 1.40 | 1.78472 | 25.7 | 24.07 | |
| 15 | −152.494 | (Variable) | | | 24.69 | |
| 16 | −540.450 | 1.50 | 1.83400 | 37.2 | 26.58 | |
| 17 | 37.295 | 4.91 | 1.48749 | 70.2 | 27.51 | |
| 18 | −259.529 | 0.15 | | | 28.50 | |
| 19 | 55.855 | 9.20 | 1.49700 | 81.5 | 30.66 | |
| 20 | −39.798 | 0.15 | | | 32.05 | |
| 21* | −110.007 | 3.30 | 1.58913 | 61.1 | 32.33 | |
| 22* | −70.064 | (Variable) | | | 33.04 | |
| 23 | 63.877 | 3.96 | 1.48749 | 70.2 | 33.57 | |
| 24 | −335.234 | 10.38 | | | 33.43 | |
| 25 | ∞ | 21.00 | 1.80518 | 25.4 | 50.00 | |
| 26 | ∞ | 0.00 | | | 50.00 | |
| 27 | ∞ | 32.76 | 1.51633 | 64.1 | 50.00 | |
| 28 | ∞ | (Variable) | | | 50.00 | |
| Image plane | ∞ | | | | | |

-continued

Unit mm

Aspherical surface data

3rd surface

K = −8.65288e−001   A4 = 1.22436e−005   A6 = 7.39533e−010
A8 = −8.43065e−011  A10 = 3.71664e−013  A12 = −4.24726e−016

4th surface

K = −4.32910e+000   A4 = 1.95460e−005   A6 = −2.22771e−008
A8 = −1.92512e−010  A10 = 9.25357e−013  A12 = −1.52798e−015

21st surface

K = −6.58661e+001   A4 = −1.31419e−005  A6 = 5.37564e−009
A8 = 5.26551e−011   A10 = −1.95565e−013 A12 = 3.27603e−016

22nd surface

K = −7.91329e+000   A4 = −6.86802e−006  A6 = −6.67048e−009
A8 = 8.19062e−011   A10 = −2.32778e−013 A12 = 3.31672e−016

Various data
Zoom ratio 1.66

|  | Wide-angle | Intermediate | Telephoto |
|---|---|---|---|
| Focal length | 21.70 | 29.26 | 35.93 |
| F-number | 1.85 | 2.21 | 2.41 |
| Angle of view | 29.35 | 22.64 | 18.75 |
| Image height | 12.20 | 12.20 | 12.20 |
| Total lens length | 209.67 | 209.67 | 209.67 |
| BF | 0.67 | 0.67 | 0.67 |
| d 8 | 5.18 | 1.58 | 1.44 |
| d10 | 36.57 | 18.51 | 0.90 |
| d13 | 19.11 | 24.81 | 26.51 |
| d15 | 6.24 | 3.43 | 4.37 |
| d22 | 0.65 | 19.41 | 34.52 |
| d28 | 0.67 | 0.67 | 0.67 |
| Entrance pupil position | 31.25 | 28.63 | 25.40 |
| Exit pupil position | −366.18 | −1704.97 | 686.79 |
| Front principal point position | 51.67 | 57.38 | 63.22 |
| Rear principal point position | −21.03 | −28.58 | −35.26 |

Zoom lens unit data
Unit, Start surface, Focal length, Lens configuration length,
Front principal point position, Rear principal point
position

| 1 | 1 | −22.83 | 34.39 | 10.62 | −17.79 |
| 2 | 9 | 71.22 | 4.07 | 1.94 | −0.28 |
| 3 | 11 | 74.03 | 14.08 | 0.16 | −12.27 |
| 4 | 14 | −67.38 | 1.40 | −0.27 | −1.06 |
| 5 | 16 | 61.35 | 19.21 | 13.08 | 1.17 |
| 6 | 23 | 110.08 | 68.10 | 0.43 | −45.79 |

Single lens data

| Lens | Start surface | Focal length |
|---|---|---|
| 1 | 1 | −66.63 |
| 2 | 3 | −89.71 |
| 3 | 5 | −58.65 |
| 4 | 7 | 207.45 |
| 5 | 9 | 71.22 |
| 6 | 11 | 74.03 |
| 7 | 14 | −67.38 |
| 8 | 16 | −41.55 |
| 9 | 17 | 67.05 |
| 10 | 19 | 48.18 |
| 11 | 21 | 316.68 |
| 12 | 23 | 110.08 |
| 13 | 25 | 0.00 |
| 14 | 27 | 0.00 |

Numerical Example 2

Unit mm

Surface data

| Surface No. | r | d | nd | vd | Effective diameter | θgF |
|---|---|---|---|---|---|---|
| 1 | 55.694 | 2.80 | 1.77071 | 23.0 | 53.87 | 0.720 |
| 2 | 28.950 | 6.41 | | | 44.66 | |
| 3 | 58.017 | 2.30 | 1.59240 | 68.3 | 44.40 | |
| 4 | 28.885 | 6.26 | | | 39.49 | |
| 5 | 106.104 | 4.76 | 1.84666 | 23.8 | 39.38 | |
| 6 | −129.193 | 3.50 | | | 38.84 | |
| 7 | 98.996 | 2.87 | 1.84660 | 23.5 | 31.95 | 0.596 |
| 8 | −537.251 | 1.70 | 1.49700 | 81.5 | 30.98 | |
| 9 | 22.157 | 10.32 | | | 25.62 | |
| 10 | 28.989 | 7.18 | 1.80400 | 46.6 | 27.28 | |
| 11 | −54.742 | 0.15 | | | 26.85 | |
| 12 | 319.288 | 1.48 | 1.72825 | 28.5 | 25.02 | |
| 13 | 27.425 | 5.10 | | | 23.07 | |
| 14(Aperture stop) | ∞ | 5.76 | | | 22.45 | |
| 15 | −15.906 | 1.50 | 1.84666 | 23.8 | 22.15 | |
| 16 | −187.927 | 4.36 | 1.79952 | 42.2 | 26.02 | |
| 17* | −24.117 | 0.15 | | | 27.20 | |
| 18 | −194.087 | 9.53 | 1.48749 | 70.2 | 29.33 | |
| 19 | −22.225 | 0.15 | | | 31.78 | |
| 20 | −92.792 | 5.62 | 1.62299 | 58.2 | 34.78 | |
| 21 | −29.828 | (Variable) | | | 35.53 | |
| Image plane | ∞ | | | | | |

Aspherical surface data
17th surface

K = 0.00000e+000    A4 = 2.06918e−005   A6 = 4.34696e−008
A8 = 1.06970e−010   A10 = −2.35887e−013 A12 = −6.06423e−017

Various data

| Zoom ratio | 1.00 |
| Focal length | 24.70 |
| F-number | 1.45 |
| Angle of view | 41.17 |
| Image height | 21.60 |
| Total lens length | 120.00 |
| BF | 38.10 |
| d21 | 38.10 |
| Entrance pupil position | 30.77 |
| Exit pupil position | −55.37 |
| Front principal point position | 48.95 |
| Rear principal point position | 13.40 |
| Rear principal point position | |

Unit, Start surface, Focal length, Lens configuration length,
Front principal point position, Rear principal point
position

| 1 | 1 | 24.70 | 81.90 | 48.95 | 13.40 |

Single lens data

| Lens | Start surface | Focal length |
|---|---|---|
| 1 | 1 | −81.96 |
| 2 | 3 | −100.04 |
| 3 | 5 | 69.45 |
| 4 | 7 | 98.94 |
| 5 | 8 | −42.77 |
| 6 | 10 | 24.51 |
| 7 | 12 | −41.29 |
| 8 | 15 | −20.61 |
| 9 | 16 | 34.20 |
| 10 | 18 | 50.57 |
| 11 | 20 | 68.22 |

Numerical Example 3

Unit mm

Surface data

| Surface No. | r | d | nd | vd | Effective diameter | θgF |
|---|---|---|---|---|---|---|
| 1 | 45.475 | 2.20 | 1.69680 | 55.5 | 44.85 | |
| 2 | 25.911 | 5.55 | | | 38.68 | |
| 3 | 56.069 | 1.75 | 1.69680 | 55.5 | 38.48 | |
| 4 | 29.986 | 5.91 | | | 35.48 | |
| 5 | 290.699 | 1.80 | 1.65844 | 50.9 | 35.32 | |
| 6 | 52.903 | 3.36 | | | 34.46 | |
| 7* | 1470.281 | 3.60 | 1.52996 | 55.8 | 34.62 | |
| 8* | 429.394 | (Variable) | | | 34.56 | |
| 9 | 296.060 | 5.90 | 1.54814 | 45.8 | 36.11 | |
| 10 | −45.445 | 0.15 | | | 36.15 | |
| 11 | 67.812 | 3.55 | 1.67270 | 32.1 | 33.32 | |
| 12 | −527.088 | 1.95 | | | 32.72 | |
| 13 | −67.641 | 2.20 | 1.65844 | 50.9 | 32.52 | |
| 14 | −646.266 | (Variable) | | | 31.62 | |
| 15 | 85.211 | 2.61 | 1.56384 | 60.7 | 22.58 | |
| 16 | −68.338 | (Variable) | | | 22.61 | |
| 17 | 30.967 | 1.00 | 1.72342 | 38.0 | 21.01 | |
| 18 | 20.990 | (Variable) | | | 20.26 | |
| 19 | −19.301 | 1.35 | 1.85945 | 25.0 | 20.93 | 0.606 |
| 20 | 93.629 | 7.80 | 1.49700 | 81.5 | 24.79 | |
| 21 | −23.365 | 0.15 | | | 27.53 | |
| 22 | 142.941 | 8.62 | 1.48749 | 70.2 | 33.46 | |
| 23 | −29.507 | (Variable) | | | 34.63 | |
| 24 | 94.707 | 3.97 | 1.77071 | 23.0 | 36.54 | 0.668 |
| 25 | −176.035 | 10.51 | | | 36.46 | |
| 26 | ∞ | 30.30 | 1.51633 | 64.1 | 50.00 | |
| 27 | ∞ | 0.00 | | | 50.00 | |
| 28 | ∞ | 21.00 | 1.69680 | 55.5 | 51.06 | |
| 29 | ∞ | (Variable) | | | 51.06 | |
| Image plane | ∞ | | | | | |

Aspherical surface data

7th surface

K = 4.92437e+003  A4 = 1.91390e−005  A6 = −4.28805e−008
A8 = 7.78323e−011  A10 = −1.27206e−013

8th surface

K = 0.00000e+000  A4 = 1.26356e−005  A6 = −3.92255e−008
A8 = 4.55361e−011  A10 = −4.85175e−014  A12 = −6.60374e−017

Various data
Zoom ratio 1.56

| | Wide-angle | Intermediate | Telephoto |
|---|---|---|---|
| Focal length | 18.39 | 22.02 | 28.74 |
| F-number | 1.85 | 2.14 | 2.60 |
| Angle of view | 33.56 | 28.99 | 23.00 |
| Image height | 12.20 | 12.20 | 12.20 |
| Total lens length | 202.49 | 202.49 | 202.49 |
| BF | 0.25 | 0.25 | 0.25 |
| d8 | 31.19 | 22.28 | 12.34 |
| d14 | 34.95 | 31.31 | 23.24 |
| d16 | 0.70 | 6.79 | 18.32 |
| d18 | 9.51 | 10.36 | 8.29 |
| d23 | 0.65 | 6.26 | 14.81 |
| d29 | 0.25 | 0.25 | 0.25 |
| Entrance pupil position | 33.47 | 32.53 | 30.28 |
| Exit pupil position | −167.34 | −789.72 | 320.76 |
| Front principal point position | 49.84 | 53.94 | 61.60 |
| Rear principal point position | −18.14 | −21.77 | −28.49 |

Zoom lens unit data
Unit, Start surface, Focal length, Lens configuration length, Front principal point position, Rear principal point position

| | | | | | |
|---|---|---|---|---|---|
| 1 | 1 | −27.91 | 24.17 | 8.96 | −10.87 |
| 2 | 9 | 58.25 | 13.76 | 1.60 | −7.57 |
| 3 | 15 | 67.44 | 2.61 | 0.93 | −0.75 |
| 4 | 17 | −93.51 | 1.00 | 1.88 | 1.27 |
| 5 | 19 | 168.69 | 17.91 | 55.22 | 65.70 |
| 6 | 24 | 79.70 | 65.78 | 0.79 | −44.29 |

Single lens data

| Lens | Start surface | Focal length |
|---|---|---|
| 1 | 1 | −90.29 |
| 2 | 3 | −94.77 |
| 3 | 5 | −98.11 |
| 4 | 7 | −1141.49 |
| 5 | 9 | 71.98 |
| 6 | 11 | 88.95 |
| 7 | 13 | −114.43 |
| 8 | 15 | 67.44 |
| 9 | 17 | −93.51 |
| 10 | 19 | −18.36 |
| 11 | 20 | 38.38 |
| 12 | 22 | 50.85 |
| 13 | 24 | 79.70 |
| 14 | 26 | 0.00 |
| 15 | 28 | 0.00 |

Numerical Example 4

Unit mm

Surface data

| Surface No. | r | d | nd | vd | Effective diameter | θgF |
|---|---|---|---|---|---|---|
| 1* | 4738.040 | 2.30 | 1.78800 | 47.4 | 51.21 | |
| 2 | 20.470 | 9.42 | | | 35.73 | |
| 3 | 63.482 | 1.80 | 1.83400 | 37.2 | 34.59 | |
| 4 | 42.877 | 0.16 | 1.52421 | 51.4 | 32.69 | |
| 5* | 44.912 | 6.20 | | | 32.23 | |
| 6 | −66.557 | 1.60 | 1.80400 | 46.6 | 31.96 | |
| 7 | −10056.225 | 0.15 | | | 31.79 | |
| 8 | 56.867 | 4.50 | 1.80518 | 25.4 | 31.58 | |
| 9 | −1874.518 | (Variable) | | | 30.91 | |
| 10 | 151.952 | 1.30 | 1.80518 | 25.4 | 23.57 | |
| 11 | 34.226 | 5.20 | 1.54072 | 47.2 | 23.43 | |
| 12 | −465.851 | 0.15 | | | 24.55 | |
| 13 | 124.979 | 2.55 | 1.80400 | 46.6 | 25.08 | |
| 14 | −158.347 | (Variable) | | | 25.38 | |
| 15 | 78.911 | 3.80 | 1.62299 | 58.2 | 27.46 | |
| 16 | −59.908 | (Variable) | | | 27.47 | |
| 17 (Aperture stop) | ∞ | 1.90 | | | 24.22 | |
| 18 | −116.563 | 1.40 | 1.88300 | 40.8 | 23.86 | |
| 19 | −1447.804 | 2.36 | | | 23.77 | |
| 20 | −42.942 | 1.10 | 1.67300 | 38.2 | 23.69 | |
| 21 | 32.978 | 5.50 | 1.86000 | 19.5 | 24.55 | 0.674 |
| 22 | −1666.998 | (Variable) | | | 24.75 | |
| 23 | 24.477 | 8.50 | 1.54814 | 45.8 | 25.29 | |
| 24 | −24.695 | 1.20 | 1.80100 | 35.0 | 24.71 | |
| 25 | −46.146 | 0.20 | | | 24.38 | |
| 26 | 150.800 | 1.20 | 1.89676 | 23.0 | 22.74 | 0.611 |
| 27 | 15.570 | 6.95 | 1.54814 | 45.8 | 21.54 | |
| 28 | 147.222 | 0.20 | | | 22.70 | |
| 29 | 115.818 | 2.90 | 1.63980 | 34.5 | 22.93 | |

-continued

Unit mm

| | | | |
|---|---|---|---|
| 30* | −124.219 | (Variable) | 23.59 |
| Image plane | ∞ | | |

Aspherical surface data

1st surface

| | | |
|---|---|---|
| K = −1.61860e+006 | A4 = 1.80026e−005 | A6 = −2.76867e−008 |
| A8 = 3.39380e−011 | A10 = −2.65233e−014 | A12 = 1.00913e−017 |

5th surface

| | | |
|---|---|---|
| K = 3.55823e+000 | A4 = 8.40108e−006 | A6 = 1.09251e−008 |
| A8 = −1.21324e−010 | A10 = −1.67752e−013 | A12 = 7.17719e−016 |

30th surface

| | | |
|---|---|---|
| K = −4.73949e+001 | A4 = 8.04116e−006 | A6 = 3.07642e−008 |
| A8 = −1.16757e−010 | A10 = −9.21350e−014 | A12 = 1.62662e−015 |

Various data
Zoom ratio 2.06

| | Wide-angle | Intermediate | Telephoto |
|---|---|---|---|
| Focal length | 16.48 | 24.02 | 33.95 |
| F-number | 2.17 | 2.46 | 2.91 |
| Angle of view | 52.70 | 42.01 | 32.51 |
| Angle of view | 21.64 | 21.64 | 21.64 |
| Total lens length | 154.12 | 145.89 | 147.20 |
| BF | 36.24 | 45.01 | 56.23 |
| d9 | 27.32 | 10.31 | 0.41 |
| d14 | 6.67 | 6.67 | 6.67 |
| d16 | 0.93 | 5.03 | 10.14 |
| d22 | 10.43 | 6.33 | 1.22 |
| d30 | 36.24 | 45.01 | 56.23 |
| Entrance pupil position | 19.13 | 18.23 | 18.33 |
| Exit pupil position | −46.73 | −36.57 | −26.92 |
| Front principal point position | 32.33 | 35.17 | 38.42 |
| Rear principal point position | 19.75 | 20.99 | 22.28 |

Zoom lens unit data
Unit, Start surface, Focal length, Lens configuration length,
Front principal point position, Rear principal point position

| | | | | | |
|---|---|---|---|---|---|
| 1 | 1 | −24.28 | 26.13 | 1.46 | −20.56 |
| 2 | 10 | 97.17 | 9.20 | 5.37 | −0.28 |
| 3 | 15 | 55.24 | 3.80 | 1.35 | −1.02 |
| 4 | 17 | −60.47 | 12.25 | 3.30 | −5.30 |
| 5 | 23 | 50.02 | 21.15 | 1.35 | −12.81 |

Single lens data

| Lens | Start surface | Focal length |
|---|---|---|
| 1 | 1 | −26.10 |
| 2 | 3 | −164.94 |
| 3 | 4 | 1757.36 |
| 4 | 6 | −83.34 |
| 5 | 8 | 68.62 |
| 6 | 10 | −55.14 |
| 7 | 11 | 59.18 |
| 8 | 13 | 87.23 |
| 9 | 15 | 55.24 |
| 10 | 18 | −143.64 |
| 11 | 20 | −27.56 |
| 12 | 21 | 37.66 |
| 13 | 23 | 23.89 |
| 14 | 24 | −68.02 |
| 15 | 26 | −19.44 |
| 16 | 27 | 31.18 |
| 17 | 29 | 94.12 |

Numerical Example 5

Unit mm

Surface data

| Surface No. | r | d | nd | vd | Effective diameter | θgF |
|---|---|---|---|---|---|---|
| 1 | 98.467 | 2.80 | 1.83481 | 42.7 | 56.28 | |
| 2 | 36.540 | 6.05 | | | 47.63 | |
| 3 | 73.179 | 2.30 | 1.74100 | 52.6 | 46.83 | |
| 4 | 38.849 | 7.74 | | | 43.22 | |
| 5 | 1019.549 | 5.62 | 1.67790 | 50.7 | 42.78 | |
| 6 | −71.829 | 3.59 | | | 42.34 | |
| 7 | 45.089 | 5.15 | 1.84666 | 23.8 | 33.57 | |
| 8 | −484.645 | 1.70 | 1.49700 | 81.5 | 32.19 | |
| 9 | 20.567 | 7.00 | | | 25.19 | |
| 10 | ∞ | 5.13 | | | 22.95 | |
| 11 | 27.168 | 6.21 | 1.75500 | 52.3 | 26.05 | |
| 12 | −58.056 | 0.15 | | | 25.67 | |
| 13 | −7849.793 | 1.61 | 1.84666 | 23.8 | 24.20 | |
| 14 | 36.282 | 5.10 | | | 22.60 | |
| 15 (Aperture stop) | ∞ | 5.26 | | | 21.58 | |
| 16 | −15.475 | 1.50 | 1.84666 | 23.8 | 21.25 | 0.603 |
| 17 | 84.296 | 3.77 | 1.75500 | 52.3 | 25.61 | |
| 18* | −47.177 | 0.15 | | | 26.79 | |
| 19 | −463.672 | 7.53 | 1.65160 | 58.5 | 28.12 | |
| 20 | −20.922 | 0.15 | | | 29.34 | |
| 21 | −145.877 | 3.85 | 1.74500 | 26.0 | 30.24 | 0.668 |
| 22 | −32.355 | (Variable) | | | 30.71 | |
| Image plane | ∞ | | | | | |

Aspherical surface data
18th surface

| | | |
|---|---|---|
| K = 0.00000e+000 | A4 = 2.60951e−005 | A6 = 1.64693e−008 |
| A8 = −1.72517e−010 | A10 = 3.58053e−013 | A12 = −4.95966e−016 |

Various data

| | |
|---|---|
| Zoom ratio | 1.00 |
| Focal length | 24.60 |
| F-number | 1.50 |
| Angle of view | 41.33 |
| Image height | 21.64 |
| Total lens length | 120.30 |
| BF | 37.96 |
| d22 | 37.96 |
| Entrance pupil position | 31.53 |
| Exit pupil position | −40.38 |
| Front principal point position | 48.40 |
| Rear principal point position | 13.36 |

Zoom lens unit data
Unit, Start surface, Focal length, Lens configuration length,
Front principal point position, Rear principal point position

| | | | | | |
|---|---|---|---|---|---|
| 1 | 1 | 24.60 | 82.35 | 48.40 | 13.36 |

Single lens data

| Lens | Start surface | Focal length |
|---|---|---|
| 1 | 1 | −71.06 |
| 2 | 3 | −115.03 |
| 3 | 5 | 99.19 |
| 4 | 7 | 48.94 |
| 5 | 8 | −39.65 |
| 6 | 11 | 25.31 |
| 7 | 13 | −42.65 |
| 8 | 16 | −15.34 |

-continued

Unit mm

| 9 | 17 | 40.57 |
|---|----|-------|
| 10 | 19 | 33.40 |
| 11 | 21 | 55.01 |

Numerical Example 6

Unit mm

Surface data

| Surface No. | r | d | nd | vd | Effective diameter | θgF |
|---|---|---|---|---|---|---|
| 1 | 140.639 | 7.30 | 1.71300 | 53.9 | 59.10 | |
| 2 | -906.576 | 0.20 | | | 56.06 | |
| 3 | 67.153 | 2.00 | 1.48749 | 70.2 | 47.16 | |
| 4 | 31.370 | 10.25 | | | 40.18 | |
| 5 | -136.087 | 1.60 | 1.48749 | 70.2 | 38.09 | |
| 6 | 31.328 | (Variable) | | | 33.14 | |
| 7 | 40.004 | 4.25 | 1.84666 | 23.8 | 27.36 | |
| 8 | 250.890 | (Variable) | | | 26.19 | |
| 9 (Aperture stop) | ∞ | 3.50 | | | 23.67 | |
| 10 | 91.061 | 7.10 | 1.77250 | 49.6 | 23.50 | |
| 11 | -26.626 | 0.00 | | | 23.03 | |
| 12 | -26.642 | 1.60 | 1.80518 | 25.4 | 23.03 | |
| 13 | -202.819 | (Variable) | | | 22.61 | |
| 14 | 92.046 | 5.00 | 1.77250 | 49.6 | 21.26 | |
| 15 | -43.002 | 0.90 | | | 20.97 | |
| 16 | -32.892 | 1.50 | 1.80518 | 25.4 | 20.98 | |
| 17 | 51.153 | (Variable) | | | 22.35 | |
| 18 | -39.174 | 1.80 | 1.84660 | 23.5 | 26.50 | 0.595 |
| 19 | 142.329 | 0.00 | | | 31.00 | |
| 20 | 134.628 | 10.00 | 1.53996 | 59.5 | 31.27 | |
| 21 | -43.142 | 0.20 | | | 37.17 | |
| 22 | 32156.517 | 6.10 | 1.84666 | 23.8 | 43.19 | |
| 23 | -69.892 | 0.20 | | | 44.73 | |
| 24 | 153.672 | 10.10 | 1.77071 | 23.0 | 48.25 | 0.668 |
| 25 | -120.548 | 5.00 | | | 49.30 | |
| 26 | ∞ | 39.00 | 1.51633 | 64.1 | 49.35 | |
| 27 | ∞ | (Variable) | | | 49.53 | |
| Variable | ∞ | | | | | |

Various data
Zoom ratio 1.30

| | Wide-angle | Intermediate | Telephoto |
|---|---|---|---|
| Focal length | 45.21 | 51.49 | 58.60 |
| F-number | 2.50 | 2.74 | 3.00 |
| Angle of view | 24.87 | 22.15 | 19.68 |
| Image height | 20.96 | 20.96 | 20.96 |
| Total lens length | 178.02 | 177.66 | 177.22 |
| BF | 17.74 | 17.38 | 16.94 |
| d6 | 17.54 | 13.39 | 10.00 |
| d8 | 16.92 | 13.60 | 8.50 |
| d13 | 1.56 | 9.02 | 16.79 |
| d17 | 6.65 | 6.66 | 7.38 |
| d27 | 17.74 | 17.38 | 16.94 |
| Entrance pupil position | 42.37 | 39.05 | 34.20 |
| Exit pupil position | -157.14 | -239.25 | -476.63 |
| Front principal point | 75.89 | 80.21 | 85.85 |
| Rear principal point position | -27.47 | -34.11 | -41.66 |

-continued

Unit mm

Zoom lens unit data
Unit, Start surface, Focal length, Lens configuration length,
Front principal point position, Rear principal point position

| 1 | 1 | -47.99 | 21.35 | 18.68 | 0.67 |
|---|---|---|---|---|---|
| 2 | 7 | 55.70 | 4.25 | -0.43 | -2.71 |
| 3 | 9 | 89.90 | 12.20 | 4.81 | -3.64 |
| 4 | 14 | -80.88 | 7.40 | 8.96 | 3.98 |
| 5 | 18 | 52.50 | 72.40 | 19.47 | -23.53 |

Single lens data

| Lens | Start surface | Focal length |
|---|---|---|
| 1 | 1 | 171.26 |
| 2 | 3 | -123.02 |
| 3 | 5 | -52.07 |
| 4 | 7 | 55.70 |
| 5 | 10 | 27.39 |
| 6 | 12 | -38.25 |
| 7 | 14 | 38.56 |
| 8 | 16 | -24.67 |
| 9 | 18 | -36.12 |
| 10 | 20 | 61.73 |
| 11 | 22 | 82.38 |
| 12 | 24 | 89.08 |
| 13 | 26 | 0.00 |

Numerical Example 7

Unit mm

Surface data

| Surface No. | r | d | nd | vd | Effective diameter | θgF |
|---|---|---|---|---|---|---|
| 1 | 39.210 | 2.20 | 1.69680 | 55.5 | 44.29 | |
| 2 | 23.917 | 5.42 | | | 37.96 | |
| 3 | 44.241 | 1.75 | 1.69680 | 55.5 | 37.76 | |
| 4 | 26.817 | 7.28 | | | 34.64 | |
| 5 | -482.036 | 1.80 | 1.65844 | 50.9 | 34.46 | |
| 6 | 57.214 | 1.00 | | | 33.81 | |
| 7* | 71.177 | 3.60 | 1.52996 | 55.8 | 34.08 | |
| 8* | 66.693 | (Variable) | | | 33.57 | |
| 9 | 295.094 | 5.93 | 1.54814 | 45.8 | 35.81 | |
| 10 | -45.467 | 0.53 | | | 35.88 | |
| 11 | 64.632 | 3.88 | 1.67270 | 32.1 | 33.33 | |
| 12 | -304.211 | 1.82 | | | 32.90 | |
| 13 | -67.502 | 2.20 | 1.65844 | 50.9 | 32.72 | |
| 14 | -2511.881 | (Variable) | | | 31.99 | |
| 15 | 88.829 | 2.58 | 1.56384 | 60.7 | 23.10 | |
| 16 | -74.024 | (Variable) | | | 23.42 | |
| 17 | 30.089 | 1.00 | 2.10500 | 17.2 | 21.46 | 0.608 |
| 18 | 22.405 | (Variable) | | | 20.71 | |
| 19 | -19.818 | 1.35 | 1.80000 | 29.9 | 21.39 | |
| 20 | 92.804 | 7.60 | 1.49700 | 81.5 | 25.09 | |
| 21 | -23.851 | 0.15 | | | 27.51 | |
| 22 | 117.444 | 7.90 | 1.48749 | 70.2 | 32.50 | |
| 23 | -31.516 | (Variable) | | | 33.47 | |
| 24 | 89.230 | 3.49 | 1.77071 | 23.0 | 35.48 | 0.720 |
| 25 | -290.330 | 10.53 | | | 35.38 | |
| 26 | ∞ | 30.30 | 1.51633 | 64.1 | 50.00 | |
| 27 | ∞ | 0.00 | | | 50.00 | |
| 28 | ∞ | 21.00 | 1.69680 | 55.5 | 51.06 | |
| 29 | ∞ | (Variable) | | | 51.06 | |
| Image plane | ∞ | | | | | |

-continued

Unit mm

Aspherical surface data

7th surface

K = 0.00000e+000   A4 = 1.95177e-005   A6 = -4.08280e-008
A8 = 7.94835e-011  A10 = -1.06575e-013

8th surface

K = 0.00000e+000   A4 = 1.14504e-005   A6 = -4.08356e-008
A8 = 5.43211e-011  A10 = -2.98724e-014  A12 = -9.67414e-017

Various data
Zoom ratio 1.56

|  | Wide-angle | Intermediate | Telephoto |
|---|---|---|---|
| Focal length | 18.39 | 22.31 | 28.67 |
| F-number | 1.86 | 2.18 | 2.62 |
| Angle of view | 33.57 | 28.67 | 23.05 |
| Image height | 12.20 | 12.20 | 12.20 |
| Total lens length | 202.57 | 202.56 | 202.56 |
| BF | 0.25 | 0.24 | 0.24 |
| d8 | 34.30 | 25.09 | 16.16 |
| d14 | 34.18 | 29.51 | 20.80 |
| d16 | 0.70 | 7.66 | 18.36 |
| d18 | 9.19 | 10.36 | 8.27 |
| d23 | 0.65 | 6.39 | 15.41 |
| d29 | 0.25 | 0.24 | 0.24 |
| Entrance pupil position | 33.79 | 32.69 | 30.43 |
| Exit pupil position | -134.90 | -428.73 | 684.63 |
| Front principal point position | 49.67 | 53.84 | 60.30 |
| Rear principal point position | -18.13 | -22.07 | -28.43 |

-continued

Unit mm

Zoom lens unit data
Unit, Start surface, Focal length, Lens configuration length,
Front principal point position, Rear principal point position

| 1 | 1 | -26.47 | 23.05 | 10.26 | -8.17 |
|---|---|---|---|---|---|
| 2 | 9 | 56.30 | 14.36 | 1.65 | -7.95 |
| 3 | 15 | 72.02 | 2.58 | 0.90 | -0.75 |
| 4 | 17 | -85.22 | 1.00 | 2.00 | 1.49 |
| 5 | 19 | 124.97 | 17.00 | 38.32 | 40.11 |
| 6 | 24 | 88.91 | 65.31 | 0.46 | -44.40 |

Single lens data

| Lens | Start surface | Focal length |
|---|---|---|
| 1 | 1 | -93.53 |
| 2 | 3 | -101.92 |
| 3 | 5 | -77.57 |
| 4 | 7 | -2766.82 |
| 5 | 9 | 72.32 |
| 6 | 11 | 79.58 |
| 7 | 13 | -105.39 |
| 8 | 15 | 72.02 |
| 9 | 17 | -85.22 |
| 10 | 19 | -20.30 |
| 11 | 20 | 39.02 |
| 12 | 22 | 51.87 |
| 13 | 24 | 88.91 |
| 14 | 26 | 0.00 |
| 15 | 28 | 0.00 |

TABLE 1

|  | θL | Conditional expression (2) | Conditional expression (3) | Conditional expression (4) | Conditional expression (5) | Conditional expression (6) | Conditional expression (7) | Conditional expression (8) |
|---|---|---|---|---|---|---|---|---|
| First embodiment | 0.595 | 23.45 | -0.030 | -0.001 | 2.41 | 0.825 | 1.7707 | 0.324 |
| Second embodiment | 0.595 | 23.45 | -0.038 | -0.002 | 3.32 | 0.876 | 1.7707 | 0.494 |
| Third embodiment | 0.606 | 25.00 | -0.078 | 0.005 | 3.47 | 0.825 | 1.7707 | — |
| Fourth embodiment | 0.611 | 23.00 | -0.076 | 0.007 | 1.61 | 0.813 | 1.8600 | — |
| Fifth embodiment | 0.603 | 23.78 | -0.104 | -0.001 | 2.24 | 0.837 | 1.7450 | — |
| Sixth embodiment | 0.595 | 23.45 | -0.103 | -0.013 | 1.73 | 0.825 | 1.7707 | — |
| Seventh embodiment | 0.608 | 17.20 | -0.030 | -0.002 | 3.87 | 0.876 | 1.7707 | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157739 filed Jul. 2, 2009, which is hereby incorporated by reference herein in its entirety.

What is claimed is:

1. An optical system having a larger total lens length than a focal length and including an aperture stop in an optical path, the optical system comprising:
   lenses L and NL on at least one of a magnification conjugate side and a reduction conjugate side with respect to the aperture stop,
   wherein the lens L satisfies conditional expressions as follows, $$-1.68 \times 10^{-3} \cdot v_L + 0.590 < \theta_L < 3.15 \times 10^{-4} \cdot v_L^2 - 1.86 \times 10^{-2} \cdot v_L + 0.878, \text{ and}$$

$$5 < v_L < 27,$$

where $v_L$ and $\theta_L$ are an Abbe number and a gF-line partial dispersion ratio of a material of the lens L,
   wherein the lens NL has a refractive power with a sign opposite to a sign of the lens L and is made of a material having a highest gF-line partial dispersion ratio,
   wherein the lens L has a positive refractive power when the lens L is located at the magnification conjugate side with respect to the aperture stop, or has a negative refractive power when the lens L is located at the reduction conjugate side with respect to the aperture stop, and
   wherein the lenses L and NL satisfy a conditional expression as follows, $$-0.20 < (\theta_{NL} - \theta_L) \cdot \sqrt{(fw \cdot ft)}/f_N \leq -0.03,$$

where $f_N$ is a focal length of one of the lenses L and NL with a negative refractive power, $\theta_{NL}$ is a gF-line partial dispersion ratio of the material of the lens NL, fw is a focal length of the optical system at the wide-angle end, and ft is a focal length of the optical system at the telephoto end, fw and ft being equivalent to f if the optical system has a single focal length f.

2. The optical system according to claim 1, wherein, when $f_L$ is a focal length of the lens L, and $\Delta\theta_L$ is an anomalous partial dispersion ratio of the material of the lens L, $\Delta\theta_L$ is determined as follows, $$\Delta\theta_L = \theta_L - (-0.001682 \cdot v_L + 0.6438), \text{ and}$$

wherein the lens L satisfies a conditional expression as follows, $$-0.026 < \Delta\theta_L \cdot \sqrt{(fw \cdot ft)}/|f_L| < 0.009.$$

3. The optical system according to claim 1, wherein the lens NL satisfies a conditional expression as follows, $$1.0 < |f_{NL}/\sqrt{(fw \cdot ft)}| < 6.0,$$

where $f_{NL}$ is a focal length of the lens NL.

4. The optical system according to claim 1, wherein the lens NL satisfies a conditional expression as follows, $$0.79 < \theta_{NL} - (1.0 \times 10^{-4} \cdot v_{NL}^2 - 9.1 \times 10^{-3} \cdot v_{NL}) < 1.00,$$

where $v_{NL}$ is an Abbe number of the material of the lens NL.

5. The optical system according to claim 1, wherein the lens NL satisfies a conditional expression as follows, $$1.7 < N_{NL} < 2.3,$$

where $N_{NL}$ is a refractive index of the material of the lens NL.

6. The optical system according to claim 1, wherein the lens L is arranged at the magnification conjugate side with respect to the aperture stop, and wherein the lens L satisfies a conditional expression as follows, $$0.00 < |L/L_f| < 0.55,$$

where L and $L_f$ are respectively a distance from a lens surface vertex of a lens located at the most magnification conjugate side to the lens L and a distance from the lens L to the aperture stop.

7. The optical system according to claim 1, wherein the optical system is a zoom optical system including a first lens unit with a negative refractive power, a second lens unit with a positive refractive power, a third lens unit with a positive refractive power, a fourth lens unit with a negative refractive power, a fifth lens unit with a positive refractive power, and a sixth lens unit with a positive refractive power, in order from the magnification conjugate side to the reduction conjugate side, and
   wherein the first and sixth lens units are not moved during zooming, but the second to fifth lens units are moved during zooming.

8. The optical system according to claim 1, wherein the optical system is a zoom optical system including a first lens unit with a negative refractive power, a second lens unit with a positive refractive power, a third lens unit with a positive refractive power, a fourth lens unit with a negative refractive power, and a fifth lens unit with a positive refractive power, in order from the magnification conjugate side to the reduction conjugate side, and
   wherein all lens units are moved during zooming.

9. The optical system according to claim 1, wherein the optical system is a zoom optical system including a first lens unit with a negative refractive power, a second lens unit with a positive refractive power, a third lens unit with a positive refractive power, a fourth lens unit with a negative refractive power, and a fifth lens unit with a positive refractive power, in order from the magnification conjugate side to the reduction conjugate side, and
   wherein the first lens unit is not moved during zooming, but the second to fifth lens units are moved during zooming.

10. An image projection apparatus comprising:
    the optical system according to claim 1; and
    an image display element configured to form an original image,
    wherein the optical system projects the original image formed by the image display element.

11. An image pickup apparatus comprising:
    the optical system according to claim 1; and
    a solid-state image pickup element configured to receive an image formed by the optical system.

* * * * *